(12) United States Patent
Verschueren

(10) Patent No.: US 10,968,117 B2
(45) Date of Patent: Apr. 6, 2021

(54) ELECTROSORPTION PURIFICATION SYSTEM WITH RECIRCULATION

(71) Applicant: KONINKLIJKE PHILIPS N.V., Eindhoven (NL)

(72) Inventor: Alwin Rogier Martijn Verschueren, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 391 days.

(21) Appl. No.: 15/564,528

(22) PCT Filed: Apr. 13, 2016

(86) PCT No.: PCT/EP2016/058134
§ 371 (c)(1),
(2) Date: Oct. 5, 2017

(87) PCT Pub. No.: WO2016/166168
PCT Pub. Date: Oct. 20, 2016

(65) Prior Publication Data
US 2018/0072593 A1    Mar. 15, 2018

(30) Foreign Application Priority Data

Apr. 14, 2015  (EP) .................... 15163482

(51) Int. Cl.
*C02F 1/46* (2006.01)
*C02F 1/469* (2006.01)
(Continued)

(52) U.S. Cl.
CPC .......... *C02F 1/4602* (2013.01); *C02F 1/4691* (2013.01); *C02F 1/28* (2013.01);
(Continued)

(58) Field of Classification Search
CPC ............... C02F 2201/46115; C02F 1/4691; C02F 1/42; C02F 1/4695; C02F 1/441; C02F 2201/4613; C02F 2303/16; C02F 1/46109
(Continued)

(56) References Cited

U.S. PATENT DOCUMENTS 4,160,727 A * 7/1979 Harris, Jr. ............. G07F 13/025
                                                  210/639
4,595,498 A * 6/1986 Cohen .................. B01D 61/145
                                                  210/192
(Continued)

FOREIGN PATENT DOCUMENTS

CN   104023812 A   9/2014
CN   104507875 A   4/2015
(Continued)

OTHER PUBLICATIONS

Johnson & Newman, "Desalting by Means of Porous Carbon Electrodes", J. Electrochem. Soc. vol. 118, No. 3 (1971), pp. 510-517.
(Continued)

*Primary Examiner* — David G Cormier
*Assistant Examiner* — Thomas Bucci
(74) *Attorney, Agent, or Firm* — Schott, P.C.

(57) ABSTRACT

The invention provides a deionization system (1000) configured to deionize an aqueous liquid (10), wherein the deionization system (1000) comprises: (a) a recirculation loop (100) comprising a first loop inlet (111), a first loop outlet (121) and a second loop outlet (122); (b) a flow generation apparatus (200), configured to generate flow of the aqueous liquid (10) in the deionization system (1000); (c) an electrosorption cell unit (300) comprising a treatment section (305) for said aqueous liquid (10), wherein the treatment section (305) comprises (a) a first electrosorption
(Continued)

electrode arrangement (310) comprising a first electrosorption electrode (311), (b) a second electrosorption electrode arrangement (320) comprising a second electrosorption electrode (321), (c) a first treatment section opening (331) for introduction of the aqueous liquid (10) from the recirculation loop (100), and (d) a second treatment section opening (332) for releasing aqueous liquid (10) into the recirculation loop (100), wherein the treatment section (305) is configured downstream from the first loop inlet (111) and upstream of the second loop outlet (122).

20 Claims, 16 Drawing Sheets

(51) Int. Cl.
  *C02F 1/32* (2006.01)
  *C02F 1/28* (2006.01)
(52) U.S. Cl.
  CPC ............... *C02F 1/283* (2013.01); *C02F 1/32* (2013.01); *C02F 1/325* (2013.01); *C02F 2201/4613* (2013.01); *C02F 2201/4617* (2013.01); *C02F 2201/46115* (2013.01); *C02F 2301/046* (2013.01); *C02F 2307/12* (2013.01)
(58) Field of Classification Search
  USPC .......... 134/109, 10, 21, 115 R, 18, 111, 108;
       204/630, 631, 632, 520, 242, 633, 518,
       204/522, 525
  See application file for complete search history.

(56) References Cited

U.S. PATENT DOCUMENTS

| | | | | |
|---|---|---|---|---|
| 5,558,753 A * | 9/1996 | Gallagher | ............... | B01D 61/48 204/632 |
| 6,080,313 A * | 6/2000 | Kelada | ................ | C02F 9/005 210/202 |
| 6,149,788 A * | 11/2000 | Tessier | ................ | B01D 61/48 204/524 |
| 6,168,692 B1 * | 1/2001 | Sakai | ................ | C02F 1/46104 204/228.1 |
| 6,187,162 B1 * | 2/2001 | Mir | ................ | B01D 61/48 204/524 |
| 6,197,174 B1 * | 3/2001 | Barber | ................ | B01J 47/08 204/524 |
| 6,296,751 B1 * | 10/2001 | Mir | ................ | B01D 61/48 204/524 |
| 6,309,532 B1 | 10/2001 | Tran | | |
| 6,346,187 B1 * | 2/2002 | Tran | ................ | B82Y 30/00 205/342 |
| 6,391,178 B1 * | 5/2002 | Garcia | ................ | B01D 61/48 204/628 |
| 6,929,748 B2 * | 8/2005 | Avijit | ................ | B01D 61/022 204/524 |
| 7,658,828 B2 * | 2/2010 | Freydina | ................ | C02F 1/4695 204/519 |
| 8,562,803 B2 * | 10/2013 | Nyberg | ................ | C02F 1/46109 204/536 |
| 2002/0167782 A1 * | 11/2002 | Andelman | ................ | C02F 1/4691 361/302 |
| 2002/0185423 A1 * | 12/2002 | Boyd | ................ | C02F 1/78 210/167.3 |
| 2002/0189951 A1 * | 12/2002 | Liang | ................ | B01D 61/58 204/523 |
| 2003/0098266 A1 * | 5/2003 | Shiue | ................ | B82Y 30/00 210/87 |
| 2004/0118780 A1 * | 6/2004 | Willman | ................ | C02F 9/00 210/652 |
| 2004/0188258 A1 * | 9/2004 | Takahashi | ................ | B01D 61/48 204/631 |
| 2004/0231976 A1 * | 11/2004 | Gadini | ................ | B01D 61/54 204/240 |
| 2004/0256247 A1 * | 12/2004 | Carson | ................ | A62D 3/115 205/688 |
| 2005/0017114 A1 * | 1/2005 | Gadini | ................ | C02F 1/469 242/375.1 |
| 2005/0103622 A1 * | 5/2005 | Jha | ................ | C02F 1/469 204/237 |
| 2005/0103630 A1 * | 5/2005 | Ganzi | ................ | B01J 47/08 204/533 |
| 2005/0121334 A1 * | 6/2005 | Sumita | ................ | A61L 2/035 205/628 |
| 2006/0091077 A1 * | 5/2006 | Haas | ................ | B01D 61/48 210/641 |
| 2006/0144700 A1 * | 7/2006 | Carson | ................ | C02F 1/4672 204/252 |
| 2007/0108056 A1 * | 5/2007 | Nyberg | ................ | C02F 1/4695 204/554 |
| 2007/0187263 A1 * | 8/2007 | Field | ................ | C25B 9/206 205/742 |
| 2007/0284313 A1 | 12/2007 | Lee | | |
| 2008/0078673 A1 * | 4/2008 | Elson | ................ | C02F 1/46114 204/278.5 |
| 2008/0292717 A1 * | 11/2008 | Chen | ................ | C02F 1/46109 424/600 |
| 2009/0045074 A1 * | 2/2009 | Hoover | ................ | C02F 1/4691 205/687 |
| 2009/0235481 A1 * | 9/2009 | Gosebruch | ................ | A47L 11/40 15/320 |
| 2010/0044244 A1 * | 2/2010 | Lee | ................ | C02F 1/4691 205/687 |
| 2010/0270161 A1 * | 10/2010 | Hyun | ................ | C02F 1/46104 204/665 |
| 2011/0000789 A1 * | 1/2011 | Grabowski | ................ | C02F 1/4695 204/520 |
| 2011/0024361 A1 * | 2/2011 | Schwartzel | ................ | C02F 1/46109 210/739 |
| 2011/0120886 A1 * | 5/2011 | Jha | ................ | C02F 5/00 205/743 |
| 2011/0162964 A1 * | 7/2011 | Freydina | ................ | C02F 1/66 204/519 |
| 2013/0209916 A1 | 1/2013 | Kim | | |
| 2013/0277222 A1 * | 10/2013 | Kwon | ................ | C02F 1/4691 204/555 |
| 2013/0306565 A1 * | 11/2013 | Davis | ................ | C02F 1/46104 210/675 |
| 2014/0001053 A1 * | 1/2014 | Longhenry | ................ | C25B 1/22 205/337 |
| 2014/0251824 A1 * | 9/2014 | Astle | ................ | B01D 61/48 205/749 |
| 2014/0262812 A1 * | 9/2014 | Longhenry | ................ | C02F 1/4618 205/510 |
| 2014/0353167 A1 * | 12/2014 | Cho | ................ | C02F 1/4691 205/743 |
| 2015/0027890 A1 * | 1/2015 | Jha | ................ | B01J 39/05 204/520 |
| 2015/0158747 A1 * | 6/2015 | Lee | ................ | C02F 1/4695 204/519 |
| 2015/0173585 A1 * | 6/2015 | Disch | ................ | A47L 15/4231 134/10 |
| 2015/0210565 A1 * | 7/2015 | Kamimura | ................ | C02F 5/00 210/670 |
| 2015/0299016 A1 * | 10/2015 | Kamimura | ................ | B01J 49/70 210/202 |
| 2015/0315038 A1 * | 11/2015 | Astle | ................ | C02F 1/42 210/677 |
| 2016/0002076 A1 * | 1/2016 | Jha | ................ | C02F 1/4695 204/520 |
| 2016/0037793 A1 * | 2/2016 | Park | ................ | C02F 1/441 426/271 |
| 2016/0039688 A1 * | 2/2016 | Suzuki | ................ | C02F 1/4695 204/550 |
| 2016/0355418 A1 * | 12/2016 | Lee | ................ | C02F 1/4691 |

(56) References Cited

U.S. PATENT DOCUMENTS

2016/0368790 A1* 12/2016 Son .................. C02F 1/4691
2017/0001885 A1     1/2017 Verschueren

FOREIGN PATENT DOCUMENTS

KR      20110045145 A    5/2011
WO       2014155660 A1   10/2014

OTHER PUBLICATIONS

Anderson et al, "Capacitive deionization as an electrochemical means of saving energy and delivering clean water", Electrochimica Acta 55 (2010), pp. 3845-3856.
Chun, F., Public Hygienics, Xiamen University Press, pp. 361-362, Jan. 31, 2009.
China Environmental Protection Industry Association, "Compilation of State Key Environmental Protection Practices and Demonstration Projects 2013", China Environmental Science Publishing House, pp. 192-195, Sep. 30, 2014.

* cited by examiner

ELECTROSORPTION PURIFICATION SYSTEM WITH RECIRCULATION

This application is the U.S. National Phase application under 35 U.S.C. § 371 of International Application No. PCT/EP2016/058134, filed on Apr. 13, 2016, which claims the benefit of International Application No. 15163482.1 filed on Apr. 14, 2015. These applications are hereby incorporated by reference herein.

FIELD OF THE INVENTION

The invention relates to a deionization system. The invention further relates to a domestic appliance comprising such deionization system. Yet, the invention also relates to a deionization method.

BACKGROUND OF THE INVENTION

Electrochemical treatments of fluids are known in the art. U.S. Pat. No. 8,562,803, for instance, describes a fluid treatment apparatus for treating a fluid which apparatus comprises an electrochemical cell having fluid orifices to receive and release fluid, and a fluid passageway connecting the orifices with a water-splitting ion exchange membrane which is exposed to the fluid in the passageway. First and second electrodes are positioned about the membrane. The apparatus also comprises a controller to control and operate a power supply and valve system. The power supply supplies a current to the first and second electrodes at sufficiently high current density to result in bacteriostasis, deactivation, or a reduction in the microorganisms in the fluid. The controller can also operate a set of cells to deionize fluid and regenerate the cells.

U.S. Pat. No. 6,346,187 describes an electrically regeneratable battery of electrochemical cells for capacitive deionization (including electrochemical purification) and regeneration of electrodes is operated at alternate polarities during consecutive cycles. By polarizing the cells, ions are removed from the electrolyte and are held in the electric double layers formed at the carbon aerogel surfaces of the electrodes. U.S. Pat. No. 6,346,187 states that as each cell is saturated with the removed ions, each cell is regenerated electrically, thus significantly minimizing secondary wastes.

US 2016/0039688, a family member of WO2014/155660, desires to propose a system to reliably prevent the precipitation of scale during a reclamation step in a deionization treatment. A water reclamation system and a deionization treatment device each comprises a deionization section, a supply section which supplies a scale inhibitor to a water to be treated, and a control section. The control section acquires a supply start time and a supply stop time for at least one of the scale inhibitor and a low ion concentration water based on the concentration of a scale component in the deionization section, and causes the supply section to supply at least one of the scale inhibitor and the low ion concentration water in the interval between the supply start time and the supply stop time. There may be a circulation section which circulates at least one of the concentrated water discharged from the deionization section and the treated water to the supply section

SUMMARY OF THE INVENTION

Scale formation, also known as calcification, is an issue in many household appliances that use water, in particular hard tap water. Repeated use of these household appliances causes a build up of scale which can dramatically reduce the efficiency or quality of the function provided by the appliance. To avoid this reduced functionality and prevent malfunction, regular cleaning is required to remove the scale, also known as descaling, decalcifying or decalcification. Consequences of failing to descale devices may include, for example, formation of scale in coffee makers blocking the fluid flow or insulating the heating element. In steam irons scaling may lead to brownish colored water being spat onto garments. Furthermore, hard tap water used in air humidifiers based on ultrasonic transducers may spread white scaling dust.

It is known to provide a decalcifying apparatus with disposable cartridges, for example by means of ion exchange resins. Ion exchange resins decalcify water by substituting calcium and magnesium ions with sodium or potassium ions. However, the resins replace calcium and magnesium ions in water with sodium ions, which makes the treated water very sodium rich. Sodium rich water is generally not suitable for making tea, soy milk or diluting powder baby milk.

Alternatively, electrosorption may be used to treat water. Positive ions (for example, calcium ($Ca^{2+}$)) and negative ions (for example, bicarbonate ($HCO_3^-$)) are captured by electrodes driven by an electric potential applied between both electrodes. Electrosorption (also referred to as CDI (capacitive de-ionization)) is a known technology that uses electric fields to reversibly capture ions inside a porous electrode (mostly active carbon).

Electrosorption is typically operated as a batch process, consisting of a purification mode and a regeneration mode. In the purification mode, the potentials in the electrosorption cell are applied such that ions from the input water are adsorbed. Then the purified water leaving the cell is pumped to the output branch. In the regeneration mode, the electrosorption cell is operated either by an electrical shortcut or especially at reverse polarity, such that previously captured ions are actively desorbed again. Then the water with enriched ion concentration leaving the cell is pumped to the waste branch.

The conventional system architecture for electrosorption is the "single-pass" architecture.

An alternative option is to incorporate the electrosorption cell (indicated as "ES cell") inside a recirculation loop, allowing a fluid path from the ES cell outlet back to the ES cell inlet. An advantage of the recirculation loop is that the water passes the electrosorption cell multiple times, and therefore per pass needs only be purified by a lesser degree, which contributes to operating the electrosorption process at its optimal efficiency. Note that this recirculation loop by default has one inlet branch and one combined outlet branch, which further downstream splits into waste and purified output branches, analogous to the single-pass architecture.

A disadvantage of the conventional recirculation loop (with a single combined outlet branch) is that all possible positions of the buffer reservoir are unfavorable. When located inside the loop, or upstream of the split, the waste of the regeneration mode will foul the reservoir. When located outside the loop, the recirculation cannot maintain purity in the buffer reservoir, which is especially relevant after periods of non-use.

Hence, it is an aspect of the invention to provide an alternative deionization system, which preferably further at least partly obviates one or more of above-described drawbacks and/or provides one or more of the above indicated desired functionalities. Yet it is also an aspect of the invention to provide an alternative (domestic) appliance, comprising such deionization system, which preferably further at least partly obviates one or more of above-described drawbacks and/or provides one or more of the above indicated desired functionalities.

The present invention provides a deionization system comprising a recirculation loop containing two separate branches (from the loop) for waste and output flow. Especially the waste branch is located immediately downstream from the ES cell (given the flow directions in the regeneration mode (as indicated below, this position can be either upstream or downstream from the ES cell given the flow direction in the purification mode)). This may substantially ensure that the waste water will not foul the output branch and a buffer reservoir. Hence, contamination of purified water with remaining waste water after a regeneration stage can—to a very substantial extent—be circumvented or substantially be prevented. Further, the present system allows a large flexibility of arranging elements and/or of flow schemes, even including reversing a flow direction (when desired). Amongst others, this system also allows to position a buffer reservoir in between those two branches, such that the buffer reservoir is included inside the recirculation loop (so purity is maintained), while the waste output of the ES cell in the regeneration mode will not foul the buffer reservoir. Further, especially the buffer reservoir can be filled with active carbon filter material, to purify water components not captured by the electrosorption cell (such as chlorine and organic contamination). Optionally the recirculation loop may also contain a UV light source to inactivate micro organisms, to prevent biofilm formation inside the purification system.

Hence, in a first aspect the invention provides a deionization system ("system") configured to deionize an aqueous liquid, wherein the deionization system comprises (i) a recirculation loop ("loop") comprising a first loop inlet (for receiving said aqueous liquid), a first loop outlet (for waste liquid) and a second loop outlet (for purified aqueous liquid), wherein especially the second loop outlet is configured downstream from the first outlet; (ii) a flow generation apparatus, configured to generate flow of the aqueous liquid in the deionization system; and (iii) an electrosorption cell unit (herein shortly also indicated as "electrosorption cell") comprising a treatment section for said aqueous liquid, wherein the treatment section comprises (a) a first electrosorption electrode arrangement comprising a first electrosorption electrode, (b) a second electrosorption electrode arrangement comprising a second electrosorption electrode, (c) a first treatment section opening ("inlet") for introduction of the aqueous liquid from the recirculation loop, and (d) a second treatment section opening ("outlet") for releasing aqueous liquid into the recirculation loop, wherein the treatment section is configured downstream from the first loop inlet and upstream of the second loop outlet, and wherein especially the deionization system may comprise a first loop part between the electrosorption cell unit and the first loop outlet having a first volume (V1), and a second loop part downstream from the electrosorption cell unit and upstream from the second loop outlet having a second volume (V2), wherein V1/V2<0.5.

As indicated above, with such system purified aqueous liquid, such as water, depleted in cations and/or anions may be provided, with a minimum generation of waste liquid and with a minimum or even substantially no contamination of purified aqueous liquid with remaining waste water liquid. Further, this system is flexible in arrangement of system elements and also allows inclusion of a buffer vessel or water reservoir. The system also allows the use of smaller ES cells and/or the use of lower electrical powers (to purify), due to the recirculation. Herein the terms "deionization", or "deionize", etc., especially refer to "decalcification" or "decalcify", etc., respectively. Hence, the deionization system is especially a decalcification system. Especially, with the present system and method, calcium may be removed from an aqueous liquid, such as especially water. Hence, the purification stage may especially include a stage wherein at least part of the calcium may be removed from the aqueous liquid. The terms "deionization", or "deionize" may especially refer to an at least partial removal of the total amount of ions in the aqueous liquid.

The recirculation loop comprises one or more conduits and (loop) elements (such as the optional buffer reservoir), configured in such a way that liquid can flow from a first position in a first direction and return at the first position while the flow can substantially flow in a single direction during this flow. Hence, the loop notwithstanding one or more openings for introduction or release of liquid is a substantially closed loop, as is in general the case with recirculation loops or retours, etc.

This loop includes at least one inlet, the herein indicated first loop inlet. Fresh aqueous liquid (to be purified) may enter via this first loop inlet. Further, this loop includes two outlets, a first loop outlet, configured to fluidically connect the loop with a waste outlet, and a second loop outlet fluidically connect the loop with a purified liquid outlet. As indicated above, the first loop outlet and the second loop outlet do substantially not share any conduit (except part of the recirculation loop). Hence, the first loop outlet and the second loop outlet are not outlets downstream from a shared loop outlet, as may be the case in suboptimal systems, but are independent outlets, directly associated with the recirculation loop.

The recirculation loop further comprises an electrosorption cell unit. This electrosorption cell unit comprises an electrosorption cell comprising a treatment section (see further also below). This treatment section is a flow-through treatment section; i.e. the cell is a flow-through cell (see further also below).

The first loop inlet, the first loop outlet, the second loop outlet and the ES cell unit basically form the essential elements comprised with the recirculation loop. Other elements like valves, pumps, buffer reservoirs, etc. etc. are optional and/or exchangeable. For instance, a single pump can be in the loop or external from the loop, dependent upon the arrangement of valves, see further also below.

The first loop inlet, the first loop outlet, the second loop outlet and the ES cell unit can thus basically arranged anywhere in the loop (however especially taking into account that the treatment section is configured downstream from the first loop inlet and upstream of the second loop outlet). However, it is especially desirable that the first loop outlet is configured close to the ES cell unit (see also above). Further, it is especially desirable that the volume between the ES cell unit and first loop outlet is substantially smaller than between the ES cell unit and the second loop outlet. Here, the volume refers to the capacity or volume that can be stored or contained between the ES cell unit and the respective loop outlet. Note that between the ES cell unit and the second outlet optionally a buffer reservoir may be arranged (see also below), such volume (of the buffer reservoir) would also be included. This will further be discussed below.

The system can be used in at least two modes or stages: a purification stage, wherein cations and/or anions may be removed from the aqueous liquid, and a regeneration stage, wherein the adsorbed ions are released from the electrosorption electrodes. Dependent upon the configuration of the system, the stages may be executed sequentially (especially when there is only one electrosorption cell), or the stages may be executed simultaneously (especially when there are more than one electrosorption cells). In the purification stage, ions like the calcium ion and/or the bicarbonate ion may be removed from the aqueous liquid, to provide purified aqueous liquid. In the regeneration stage, ions like the calcium ion and/or bicarbonate ion may be released from the electrosorption electrodes, leading to waste liquid. The liquid herein is especially water, even more especially water comprising ions (such as one or more of calcium, sodium, chloride, and bicarbonate), such as is the case with e.g. hard water.

During the purification stage, the aqueous liquid will flow in a specific direction through the recirculation loop. During the regeneration stage, or more especially during at least part of the regeneration stage, the aqueous liquid may not flow or even flow in a reversed direction (relative to the purification stage). In the latter option, the first loop outlet and second loop outlet may be configured at opposite sides from the ES cell unit.

To simplify the definition of the location of the elements from the recirculation loop, the elements are defined with the terms "downstream" and "upstream" assuming the stage of purification including a recirculation action (irrespective of the specific stage during use of the system and irrespective of the fact of the system is being used or is not being used). Hence, only for the sake of defining the location of the elements the purification flow including a recirculation action is used. Here, the phrase "purification including a recirculation action" is applied, as the use of the system is not necessarily limited to purification including a recirculation action but the use may also include purification without a recirculation action. Hence, especially the deionization system is amongst others configured to transport at least part of the aqueous liquid in a purification stage including recirculation with a recirculation flow in a direction from the first loop inlet through the treatment section in the direction of the second loop outlet, and via the first loop inlet back to the treatment section, and wherein (the terms) "downstream" and "upstream" are defined relative to this recirculation flow in this purification stage including recirculation of the aqueous liquid, notwithstanding that in another stage there may be no flow or the flow may be reversed.

Therefore, even when e.g. in an embodiment in a regeneration stage the flow be directed opposite from the flow during a purification stage, the location of the second loop outlet is still configured downstream from the ES cell unit, as this unit is positioned in such a way that during the purification stage this unit is configured downstream from the ES cell unit. Further, the definition of "downstream" and "upstream" is especially, only for the sake of definition, based on a flow starting at the first loop inlet, flowing through the recirculation loop, and ending at the first loop inlet after a single recirculation. Again, this choice is only for the sake of definition, and is irrespective of the actual flow during a specific stage and/or the fact that during operation recirculation may occur a plurality of times.

Hence, the arrangement of the first loop inlet, the second loop outlet, and the ES cell unit is such that the ES cell unit is configured in between the first loop inlet and the second loop outlet. Would the system be used always with the same flow direction, irrespective of the stage, then especially the first loop outlet is configured between the ES cell unit and the second loop outlet, i.e. (directly) downstream from the ES cell unit and upstream of the second loop outlet. However, the first loop outlet may optionally also be configured between the first loop inlet and the ES cell unit, i.e. downstream of the first loop inlet and the ES cell, especially when a regeneration stage would include a reverse flow direction. Note, that the system may also include a plurality of first loop outlets, of which one or more may be configured upstream, and one or more may be configured downstream of the ES cell unit. Especially however, the second loop outlet(s) is (are) configured downstream of (all) the first loop outlet(s).

Hence, the terms "first loop inlet", "first loop outlet", and "second loop outlet" may each independently also refer to a plurality of first loop inlets, first loop outlets, and second loop outlets, respectively. However, the system may also include a recirculation loop including a plurality of ES cell units, see also below. The term "recirculation loop" may optionally also refer to a plurality of, optionally independent, recirculation loops. Such plurality of recirculation loops may optionally share an ES cell unit or share the loop inlet or share one or more of the outlets.

The flow generation apparatus may include any type of pump or other device known in the art to generate a flow, including peristaltic pump, gear pump, cavity pump, plunger pump, diaphragm pump, Archimedean screw, electro hydrodynamic pump, Knudsen pump, or simply hydrostatic pressure from for instance the municipal water tap. Dependent upon the use of valves and the type of valves, the deionization system may include one or more flow generation apparatus. Hence the term "flow generation apparatus" may also refer to a plurality of flow generation apparatus. The flow generation apparatus may be included in the recirculation loop, i.e. be a loop element. Hence, in a specific embodiment the flow generation apparatus is configured to provide a flow of the aqueous liquid in the recirculation loop during the purification stage. However, the flow generation apparatus may e.g. also be configured upstream of the first loop inlet. Further, as indicated above more than one flow generation apparatus may be comprised by the deionization system. The flow generation apparatus and/or another pump may in the purification stage be used to remove aqueous liquid from the treatment section and from the recirculation loop (e.g. to a waste outlet (or intermediate reservoir ("waste reservoir")).

As indicated above, the electrosorption cell unit comprises a treatment section for said aqueous liquid, wherein the treatment section comprises (a) a first electrosorption electrode arrangement comprising a first electrosorption electrode, (b) a second electrosorption electrode arrangement comprising a second electrosorption electrode.

In this unit, the aqueous liquid is purified, during the purification stage, but in this unit, also the electrosorption cell may be regenerated, leading to waste liquid (the waste liquid may be stored, see also below). The electrosorption cell unit comprises a treatment section for said aqueous liquid. The treatment section especially comprises (a) a first electrosorption electrode arrangement comprising a first electrosorption electrode, (b) a second electrosorption electrode arrangement comprising a second electrosorption electrode, and (c) a first treatment section opening for introduction of the aqueous liquid. Herein, the term "first electrode arrangement", "second electrode arrangement", "first electrosorption electrode", and "second electrosorption electrode", etc., may each independently also refer to a plurality of first electrode arrangements, second electrode arrangements, first electrosorption electrodes, and second electrosorption electrodes, etc. Herein, the term "electrolytic cell unit" refers to a unit comprising the first electrode arrangement and the second electrode arrangement. Especially, these are separated by a treatment space.

Further, between the first electrode arrangement and the second electrode arrangement, optionally an ion generating element (see further also below) may be arranged. The ion generating element may thus be configured to split the electrolytic cell unit (or electrolytic cell section) into two (separate) cells. By using a flow of the aqueous solution through the electrolytic cell unit or by using an isolating arrangement (optionally in combination with the ion generating element)(see also below), the two cell parts (of the electrolytic cell unit) may substantially be isolated from each other (though downstream the aqueous liquid from both parts may be combined again). Note that when a water-splitting membrane may be used, the water-splitting membrane may provide a third volume, between the respective two cell parts. This is further elucidated below.

The system as described herein may include a plurality of electrolytic cells, which may in an embodiment be configured in series, in an embodiment be configured parallel, and in yet a further (hybrid) embodiment some of them may be configured in series and some of them may be configured parallel (see further also below).

Note that the first electrosorption electrode and the second electrosorption electrode may especially be arranged parallel to each other. Further these electrodes may in general have a similar height or length. Likewise, the ion generating element (see further also below) may substantially have the same height or length, allowing a layered structure of first electrosorption electrode, space for aqueous solution, ion generating element, space for aqueous solution, and second electrosorption electrode.

The deionization system may be configured, in the first operating condition, to apply a voltage between the first electrode arrangement, having a low potential, and the second electrode arrangement, having a high potential, to attract the ions to the electrode arrangements and remove the ions from the aqueous solution, and may be configured, in the second operating condition, to reverse the polarity to apply a voltage between the first and second electrode arrangements with the potentials reversed such that the first electrode arrangement has a high potential and the second electrode arrangement has a low potential to regenerate the ions removed from the aqueous solution.

The electrosorption electrodes may amongst others e.g. comprise porous active carbon. It appears advantageous when one or more of the electrodes further comprises an ion selective membrane. This may inhibit deposition of ions during regeneration. Hence, in a specific embodiment the first electrosorption electrode arrangement comprises said first electrosorption electrode and a first ion selective membrane, and the second electrosorption electrode arrangement comprises said second electrosorption electrode and a second ion selective membrane, wherein one of the first ion selective membrane and the second ion selective membrane is selective for one or more cations and wherein the other is selective for one or more anions. During purification the anode may attract negative ions; hence the anode may include an ion selective membrane, selective for negative ions, especially at least selective for e.g. $HCO_3^-$ and/or $Cl^-$, and especially not selective (i.e. no membrane function but blocking function) for cations such as $Na^+$ and/or $Ca^{2+}$). Hence, the opposite electrode, the cathode, may especially include an ion selective membrane, selective for positive ions, especially at least selective for e.g. $Na^+$ and/or $Ca^{2+}$), and especially not selective (i.e. no membrane function but blocking function) for anions such as $HCO_3^-$ and/or $Cl^-$.

As indicated above, the electrosorption cell may further include an ion generating element. The ion generating element during the regeneration phase may (when interposed) be configured to substantially block recombination between ions desorbed from the respective (facing) first and second electrosorption electrodes and may be configured to generate hydrogen and hydroxide ions, especially thereby maintaining charge balance with these desorbed ions. Hence, the term "interposed" especially indicates that the water splitting membrane is configured between the first electrode arrangement, more especially the first electrosorption electrode, and second electrode arrangement, more especially the second electrosorption electrode. Due to the interposed electrode, a direct (linear) migration of ions from one electrode to the other may not be possible. Hence, the ion generating element may be configured to at least partially fluidically isolate the aqueous liquid at the first electrosorption electrode side of the electrolytic cell and the aqueous liquid at the second electrosorption electrode side of the electrolytic cell. Therefore, the ion generating element may especially be configured to at least partially fluidically isolate the first electrode arrangement from the second electrode arrangement.

Hence, in yet a further embodiment the deionization system further comprises a first cell comprising said first electrosorption electrode arrangement, and a second cell comprising said second electrosorption electrode arrangement, wherein the first cell and the second cell are separated by a water splitting membrane or by an electrically floating electrode. Herein, the electrosorption cell refers to a cell comprising two electrodes as described herein. Such electrosorption cell may thus optionally be divided in two cell parts, here indicated as first cell and second cell, which may be separated by the ion generating element, such as a water splitting membrane or an electrically floating electrode.

Hence, the ion generating element may comprise a water-splitting membrane. Especially, the water-splitting membrane may be configured interposed (between the electrosorption electrodes, but not in physical and electrical contact with any of them). The water-splitting membrane generates hydrogen cations and hydroxide anions by autoionization of water and therefore this arrangement prevents the formation of gas during the second operating condition, for example the formation of chlorine gas and hydrogen and oxygen gas which may be formed during electrolysis of water.

The water-splitting membrane may comprise an anion exchange membrane and a cation exchange membrane. With this arrangement, in the second operating condition, the anion exchange membrane allows hydroxide ions to pass through it towards the first electrode arrangement and the cation exchange membrane allows hydrogen ions to pass through it towards the second electrode arrangement. Therefore, the efficiency of the electrolytic cell section is maximized.

The water-splitting membrane may comprise an exchange membrane flow space (or spacer) between the anion exchange membrane and the cation exchange membrane. With this arrangement the flow spacer element provides space between the exchange membranes for untreated aqueous solution containing ions. This can contribute to the conductivity, and so lower the voltage drop over the water-splitting membrane. In such instance, there may be three volumes (and/or flows) of aqueous solution.

The water-splitting membrane may further comprise a proton conducting material between the anion exchange membrane and the cation exchange membrane. With this arrangement the proton conducting material between the exchange membranes may facilitate the transport of hydrogen ions between the membranes, lowering the voltage drop over the water-splitting membrane. The proton conducting material typically consists of polyaromatic polymers, partially fluorinated polymers or perfluorinated polymers, e.g. like Nafion.

The ion generating element may not be electrically connected. Therefore, the system is simplified. Hence, the ion generating element may be a floating electrode. As indicated above, the ion generating element may be configured to divide the electrolytic cell unit in two parts, which (division) may especially be useful during regeneration. As the ion generating element does not need to be electrically connected, the construction—and thus production—of the system may be greatly simplified. It surprisingly appears that with such floating electrode, efficient regeneration may be executed. Without externally providing a current to the ion generating element, ions are generated, as the floating electrode is configured in between (at least part) of the first electrode arrangement and second electrode arrangement. The floating electrode may (substantially) ensure that equal amounts of hydrogen cations and hydroxide anions are created, thereby (substantially) ensuring that the overall pH of the combined solutions in the electrolytic cell remains unaffected.

Optionally, the ion generating element is configured movable relative to the electrodes (or vice versa), allowing a first configuration wherein the ion generating element is not (entirely) interposed during the purification stage, and a second configuration wherein the ion generating element is (entirely) interposed between the electrodes during the regeneration stage. Hence, in embodiments the ion generating element is configured to be absent from the electrolytic cell section in the first operating condition, or the ion generating element is interposed in the electrolytic cell section in the first operating condition. In a specific embodiment, a deionization system according to one aspect of the present invention is characterized in that the ion generating element is interposed in the electrolytic cell section (or electrolytic cell unit) only in the second operating condition. In yet another embodiment, a deionization system according to one aspect of the present invention is characterized in that the ion generating element is interposed always in the electrolytic cell section (or electrolytic cell unit). Alternatively, the ion generating element may be interposed in the electrolytic cell section in the first operating condition. Hence, the ion generating element may also be a stationary configured body. The ion generating element may be an interposed electrode. Hence, especially, the electrode, as embodiment of the ion generating element, may be configured interposed (between the electrosorption electrodes, but not in physical and electrical contact with any of them). The interposed electrode may be formed from carbon and/or titanium. The surface area of the interposed electrode may be less than the surface area of each of the first electrode arrangement and second electrode arrangement. This arrangement may help to ensure that the electrolysis reactions occur on the interposed electrode and not on the first electrode arrangement and second electrode arrangement. The ion generating element may be configured to be absent from the electrolytic cell section in the first operating condition.

As indicated above, the electrosorption cell may thus optionally be divided in two cell parts, here indicated as first cell and second cell. Even, the cell may be divided in three cell parts, such as when e.g. a flow spacer element is applied within a water splitting membrane. Hence, upstream of such electrosorption cell the aqueous flow may be divided into two or more flows, and downstream thereof the two or more flows may be recombined. Optionally, downstream from the ES cell, two (or more) flows are not recombined, and follow different recirculation loops. For instance, a first recirculation loop downstream from a first cell may optionally be configured to provide purified aqueous liquid to a second cell. Such cross-over loop may provide e.g. in a first circulation a purification on cations and in a second circulation on anions, etc.

However, as indicated above, in an embodiment downstream of these cell parts the flows may also be recombined into a single flow. Hence, in a specific embodiment the deionization system further comprises a first cell comprising said first electrosorption electrode arrangement, and a second cell comprising said second electrosorption electrode arrangement, wherein the first cell and the second cell are separated by a water splitting membrane or by an electrically floating electrode, and wherein both the first cell and the second cell are at one side in fluid connection with the (upstream) first loop inlet, and at another side in fluid connection with the (downstream) second loop outlet.

Further, as indicated above, the ES cell unit comprises (c) a first treatment section opening for introduction of the aqueous liquid from the recirculation loop, and (d) a second treatment section opening for releasing aqueous liquid into the recirculation loop, wherein the treatment section is configured downstream from the first loop inlet and upstream of the second loop outlet. Hence, the loop inlet is especially configured for receiving said aqueous solution and the loop outlet is especially configured for releasing said aqueous solution. Thus, the electrolytic cell unit is especially configured as flow-through unit, and may be configured to flow the aqueous solution between the first electrode arrangement, more especially the first electrosorption electrode, and the second electrode arrangement, more especially the second electrosorption electrode. Especially, the electrode arrangements may be configured parallel to each other. Yet more especially, the electrosorption electrodes are configured parallel to each other. In this way, the aqueous solution may flow between the electrode arrangements or electrosorption electrodes, respectively, entering the electrolytic cell unit at the opening and leaving at the outlet (depleted in ions (purified) or enriched in ions (regeneration mode)).

As indicated above, the deionization system may include a plurality of electrosorption cell units, e.g. to increase capacity and/or to allow parallel purification and regeneration. Hence, in a further embodiment the deionization system comprises a plurality of electrosorption cell units, wherein the deionization system is configured to purify the aqueous liquid in a first electrosorption cell unit and regenerate a second electrosorption cell unit simultaneously during at least part of the operation time of deionization system, and wherein the deionization system is further configured to alternate purification stages and regeneration stages of the respective electrosorption cell units. In such embodiment, the system may include a plurality of loops. In principle, two loops may suffice, as the one or more ES cell units used for the purification stage need a single loop, while the other one or more ES cell units are regenerated, and vice versa when the purification stage and regeneration stages are exchanged for the respective ES cell units. However, also a single loop might be applied. In such embodiment however, this might include a bypass for the cell units that are regenerated to remove the liquid enriched with ions during the regeneration step. Such system will then also include additional valves, to separate the regenerating ES cell unit from the recirculation loop.

In yet a further embodiment, the deionization system comprises a plurality of electrosorption cell units, each with said treatment section configured downstream from the first loop inlet and upstream of the second loop outlet. Note that a plurality of electrosorption cell units may be applied to increase the purification volume and rate and/or to allow a simultaneous purification stage and regeneration stage.

In a specific embodiment, the deionization system further comprises a DC power supply system configured to provide a voltage difference between the first electrosorption electrode and second electrosorption electrode during a purification stage (or a regeneration stage). The DC power supply system may be based on one or more of a (rechargeable) battery, a cordless powering from mains, and a corded powering by mains. Hence, in an embodiment the DC power supply system may be configured in functional connection with a receiver for cordless AC powering. Such receiver for cordless AC powering may be included in the system and may in an embodiment especially be based on inductive and/or capacitive coupling. During operation, the receiver may e.g. be powered by the external AC source, and this power is converted into DC power by the DC power supply system. Alternatively or additionally, the system may also include a wired connector, such as an electronic plug for arrangement in an AC mains socket (i.e.: an external AC power source). The DC power supply system may include a DC power supply. Further, the system may include the ability to vary the voltage difference as well as the sign of the voltage difference. Hence, to this end the DC power supply system may include a switching element, configured to switch the circuit such that sign (of the voltage difference) is reversed.

The driving force in purification is a potential difference between the electrodes. Hence, to this end the system comprises a DC power supply system. The DC power supply system may especially be configured to provide a voltage difference selected from the range of 0.5-40 V, such as in the range of 1-10 V, like 1-3 V. Further, the DC power supply system may be configured to provide a current in the range of 0.5-10 A, such as in the range of 0.5-8 A, like 0.5-6 A. Herein, phrases like "configured to provide a voltage difference selected from the range of 0.5-40 V" or "configured to provide a current in the range of 0.5-10 A", and similar phrases, indicate amongst others the maximum voltage or current that may be generated with the relevant device (such as the DC power supply system and the rechargeable battery). Such phrases do not imply that a voltage difference of 40 V or a current of 10 A is applied (always), but especially indicated that the system is able to provide such voltage difference and/or current, respectively, etc. Hence, the term "a voltage difference selected from the range of 0.5-40 V" and similar terms may thus also refer to "a voltage difference selected from the range of −0.5--40 V", etc. For the sake of clarity, herein it is further referred 0.5-40 V, etc.

As indicated above, in the regeneration mode the electrosorption cell is operated either by an electrical shortcut or especially at reverse polarity, such that previously captured ions are actively desorbed again. Then the water with enriched ion concentration leaving the cell is pumped to the waste branch. Hence, the deionization system may especially be configured to operate during part of its operation time in a regeneration stage wherein (a) a DC potential difference between the first electrosorption electrode and the second electrosorption electrode is applied (using the rechargeable battery), wherein the second DC potential difference has a sign opposite of the first DC potential difference, or (b) wherein the first electrosorption electrode and the second electrosorption electrode are electrically short circuited. Especially, when these electrodes are short circuited, no potential voltage difference is applied to the first electrosorption electrode and the second electrosorption electrode. Hence, the system may also include a switching element, configured to switch polarity of the electrodes. Herein, the term DC power supply system especially indicates a DC power supply system including the functionality to provide to the electrodes a first voltage difference and a second voltage difference, having a sign opposite of the first voltage difference. Circuitry to provide such functionality is known in the art, and is not further discussed.

In yet a further embodiment, the deionization system further comprises a mixing tank configured downstream from the first loop inlet and upstream of the electrosorption cell unit. This mixing tank may especially be used to mix fresh aqueous liquid with recirculated aqueous liquid. In an alternative embodiment, the mixing tank may comprise the first loop inlet.

In yet a further embodiment, the deionization system further comprises one or more of (i) a waste reservoir, in fluid connection with the first loop outlet, and (ii) a purified liquid reservoir, in fluid connection with the second loop outlet. The waste reservoir can be used to store aqueous liquid enriched with ions after a regeneration stage. This liquid can be removed when the reservoir is full. This may especially be of relevance for consumer appliances, as such appliances may not necessarily be functionally connected all time with a source of aqueous liquid and/or a drain to a sewer. Such reservoir allows a use of the system in e.g. handheld or otherwise mobile appliances. Especially, the system may further include pumps and/or valves to fluidically isolate the waste reservoir and/or purified liquid reservoir from the loop.

To enlarge the (rate) capacity (amount of liters that can be purified per unit time) of the system, especially in view of purified aqueous liquid, the deionization system may in an embodiment further comprising a buffer reservoir comprised by the recirculation loop, especially configured upstream from the second loop outlet but downstream of the first loop outlet. Hence, the recirculation loop may further comprise a buffer reservoir. However, other configurations may also be chosen. In embodiments, the buffer reservoir (comprised by the recirculation loop) is especially configured downstream from both the first loop outlet and the second loop outlet (but upstream of the first loop inlet). In yet further embodiments, the buffer reservoir (comprised by the recirculation loop) is especially configured downstream from loop inlet and upstream of the first loop outlet and also upstream of the electrosorption cell unit. In yet further embodiments, the buffer reservoir (comprised by the recirculation loop) is especially configured downstream from loop inlet and downstream from the electrosorption cell unit, but upstream of the first loop outlet. In yet further embodiments, the buffer reservoir (comprised by the recirculation loop) is especially configured downstream from loop inlet, downstream from electrosorption cell unit, downstream from the first loop outlet, but upstream of the second loop outlet. Especially, the loop inlet is not comprised by the buffer reservoir.

For instance, the buffer reservoir may increase the volume of the recirculation loop with a factor 2 or more, such as with a factor 4 or more (relative to the volume of the recirculation loop without buffer reservoir). Hence, the deionization system may include a buffer unit, comprising said buffer reservoir. With such buffer reservoir, the peak demand may be (further) increased. Therefore, the system may include a buffer reservoir unit, which buffer reservoir unit comprises the buffer reservoir.

Next to the purification ability of the ES cell unit, further purification actions may be included. For instance, in an embodiment the buffer reservoir further comprises an adsorbent for one or more of organic material and ions. For instance, the adsorbent may comprise (active) carbon. The adsorbent may e.g. be provided as filter unit upstream or downstream of the buffer reservoir, or may be included within the buffer reservoir. Combinations of a plurality of adsorbents, optionally at different location within the buffer unit, may also be applied. However, the adsorbent may also be arranged at other locations within the deionization system. For instance, a filter unit comprising such adsorbent may also be arranged at the first loop inlet, such that all fresh aqueous liquid first has to pass the filter unit.

In yet a further specific embodiment, the deionization system may also comprise a source of UV light configured to provide UV light to one or more of (i) the aqueous liquid within the recirculation loop and (ii) the aqueous liquid within an element comprised by the recirculation loop. Hence, e.g. the UV light may irradiate the aqueous liquid in a conduit and/or within e.g. the buffer reservoir. Hence, in an embodiment the source of UV light is configured to provide UV light to the aqueous liquid in the buffer reservoir. In a specific embodiment, the source of UV light configured to provide UV light to one or more of (i) the aqueous liquid within the recirculation loop and (ii) the aqueous liquid within an element comprised by the recirculation loop upstream from the second loop outlet but downstream of the first loop outlet.

As indicated above, the volume between the ES cell unit and the first loop outlet may especially be relatively small. This may minimize contamination of purified aqueous liquid. Especially, in an embodiment the deionization system comprises a first loop part between the electrosorption cell unit and the first loop outlet having a first volume (V1), and a second loop part downstream from the electrosorption cell unit and upstream from the second loop outlet, including an optional buffer reservoir, having a second volume (V2), wherein V1/V2<0.5, such as e.g. V1/V2<0.1.

The deionization system may further include a control unit, configured to control one or more of the DC power supply system, a flow generation system, a valve, etc. Especially, the control unit may be configured to control the deionization system as function of (a) capacity of the treatment section, (b) a parameter representative of an ion concentration in the aqueous liquid (in the treatment section), and (c) a mass rate of liquid processed by electrosorption cell. Hence, the potential difference over the electrosorption cell and/or the current through the electrosorption cell may be controlled, amongst others in dependence of the herein indicated features. For instance, the control unit may switch (for instance by using the switching unit) from regeneration to purification (i.e. e.g. switch sign) when the electrosorption cell is fully regenerated. The status of rechargeable battery, if any, may also be relevant, as the regeneration may have to be terminated when the rechargeable battery is substantially discharged. Further, when e.g. relative pure water is available in the treatment section, the potential difference over the electrosorption cell and/or current through the electrosorption cell can be low, or even zero, whereas when e.g. hard water is provided, the voltage and current may be relatively high. The parameter representative of an ion concentration may e.g. be evaluated by one or more of a conductivity sensor, ion selective electrode, and a pH meter.

The deionization system may advantageously be applied in all kind of electronic domestic appliances that use water. An electronic domestic appliance may especially be defined as a piece of electrical equipment used in the home, especially in the kitchen. Domestic appliances may, however, also be used in offices. In general, domestic appliances are not industrial appliances, but include relative small units, including e.g. portable units. Hence, in a further aspect, the invention also provides an electronic domestic appliance comprising the deionization system as described herein, further comprising a first appliance opening in fluid connection with the first loop inlet, for introduction of aqueous liquid to the electronic domestic appliance, and a functional element wherein purified aqueous liquid is applied and/or stored. The functional can be any element that uses or stores the purified aqueous liquid. For instance, electronic domestic appliance may comprise one selected from the group consisting of a floor steam cleaner, a food steamer, a kettle, a coffee maker, an espresso maker, a tea maker, a water carbonator, a water softener, a water purifier, a steam iron, and an air humidifier.

In yet a further aspect, the invention also provides a method fur deionization an aqueous liquid, especially using the decalifying system as defined herein, wherein the method comprises a purification stage, wherein at least part of the aqueous liquid is released from the recirculation loop via a the second loop outlet as purified aqueous liquid, and wherein the method comprises a regeneration stage, wherein aqueous liquid is released from the recirculation loop via the a first loop outlet as waste liquid. Especially, during the purification stage, at least part of the aqueous liquid is circulated through the recirculation loop.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1:
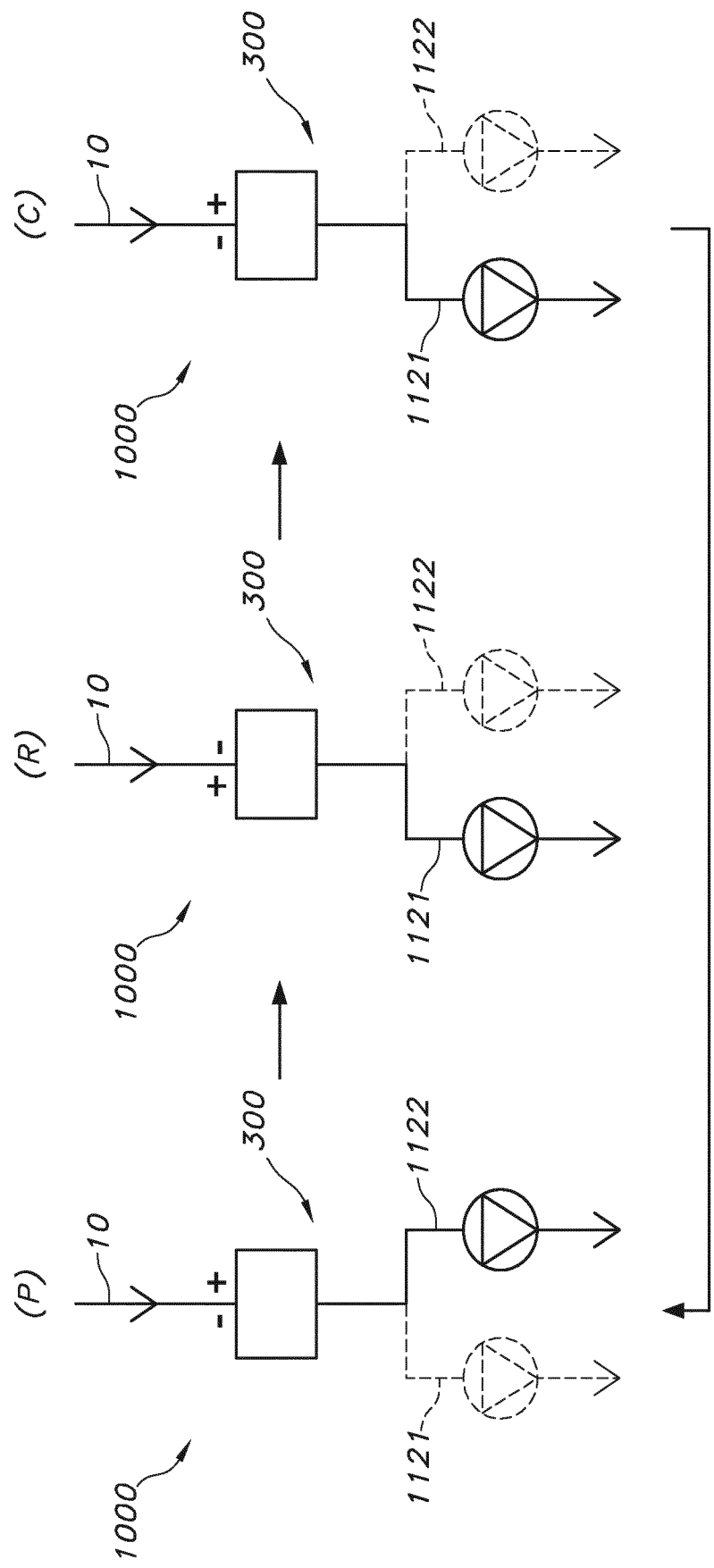
FIGS. 1-2 schematically depict some reference embodiments.

Referring to FIG. 1 a reference embodiment of a deionization system 1000 configured to deionize an aqueous liquid 10 is schematically depicted. Here, the deionization system 1000 comprises an electrosorption cell unit 300, wherein downstream from the electrosorption cell unit 300 (comprising the treatment section with the electrosorption electrodes, see further FIGS. 11, 12*a*, 13 and 14) a waste outlet 1121 and a purified liquid outlet 1122 are provided. The left graph shows the purification stage (P) and the middle graph shows the regeneration stage (R). The arrow in between indicates a sequence, in the sense that after some time purification, the electrosorption cell schematically indicated with the box with + and − (positively charged electrode and negatively charged electrode), has to be regenerated (note the change in sign relative to the purification stage (P)). Thereafter, directly the purification mode may be commenced, but optionally a clean up stage may be included (C) (note the change in sign again). This optional clean up stage has as advantage that purified water (since the cell is operated with the same polarity as in purification stage) is used to rinse the conduit downstream of the electrosorption cell unit 300, to minimize the contamination of the concentrated waste water to the purified liquid outlet 1122. Of course, since this clean up stage is lead to the waste outlet 1121, this leads to a larger waste output (but improving the quality of the purified liquid). After the clean-up stage (C), the purification stage may be started again.

Figure 2:
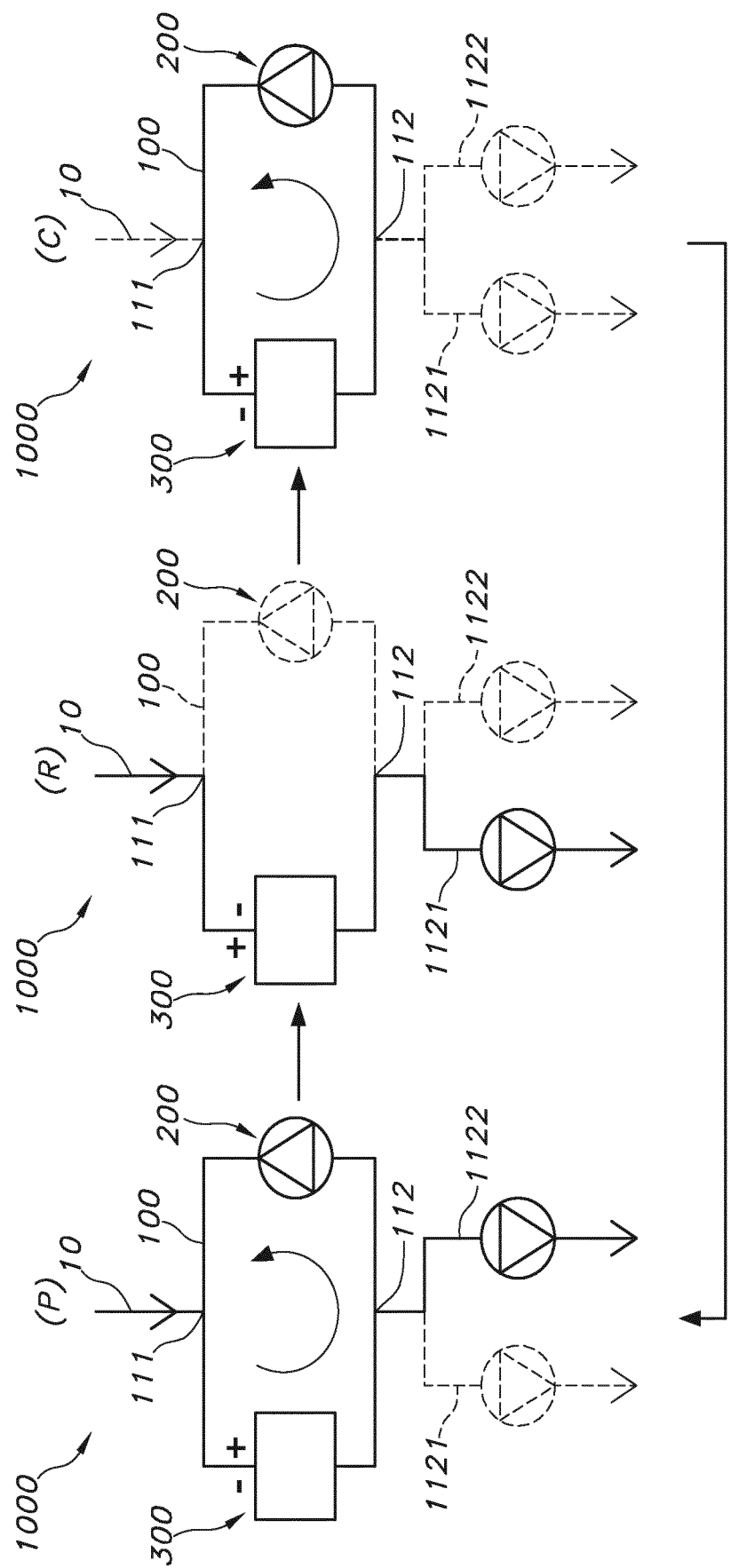

In this system of FIG. 1, optionally a recirculation loop 100 may be integrated, see FIG. 2, which shows a further reference system. An advantage of recirculation is that with a multi-pass a high purification degree may be possible. Note that in this system of FIG. 2 recirculation cannot clean part of the waste (see the dashed line in the mutual outlet passage which is shared by the waste outlet 1121 and the purified liquid outlet 1122). This waste will spoil the purified liquid output and/or increase waste output (like the above system). Reference 200 indicates a flow generation apparatus, such as a pump. Reference 111 indicates a loop inlet, for aqueous liquid 10 to be purified, and reference 112 indicates a loop outlet for purified aqueous liquid or waste liquid. Note that this loop outlet is shared by the waste outlet 1121 and the purified liquid outlet 1122, leading to the above indicated disadvantages.

A specific element of the invention is that the recirculation loop contains two separate branches for waste and output flow. This allows e.g. also to position a buffer reservoir in between those two branches, such that the buffer reservoir (see below) is included inside the recirculation loop (so purity is maintained), while the waste output of the ES cell in the regeneration mode will not foul the buffer reservoir. Preferably, the waste branch is located immediately downstream from the ES cell (given the flow directions in the regeneration mode). This ensures that the waste water will not foul the output branch and buffer reservoir.

Figure 3:
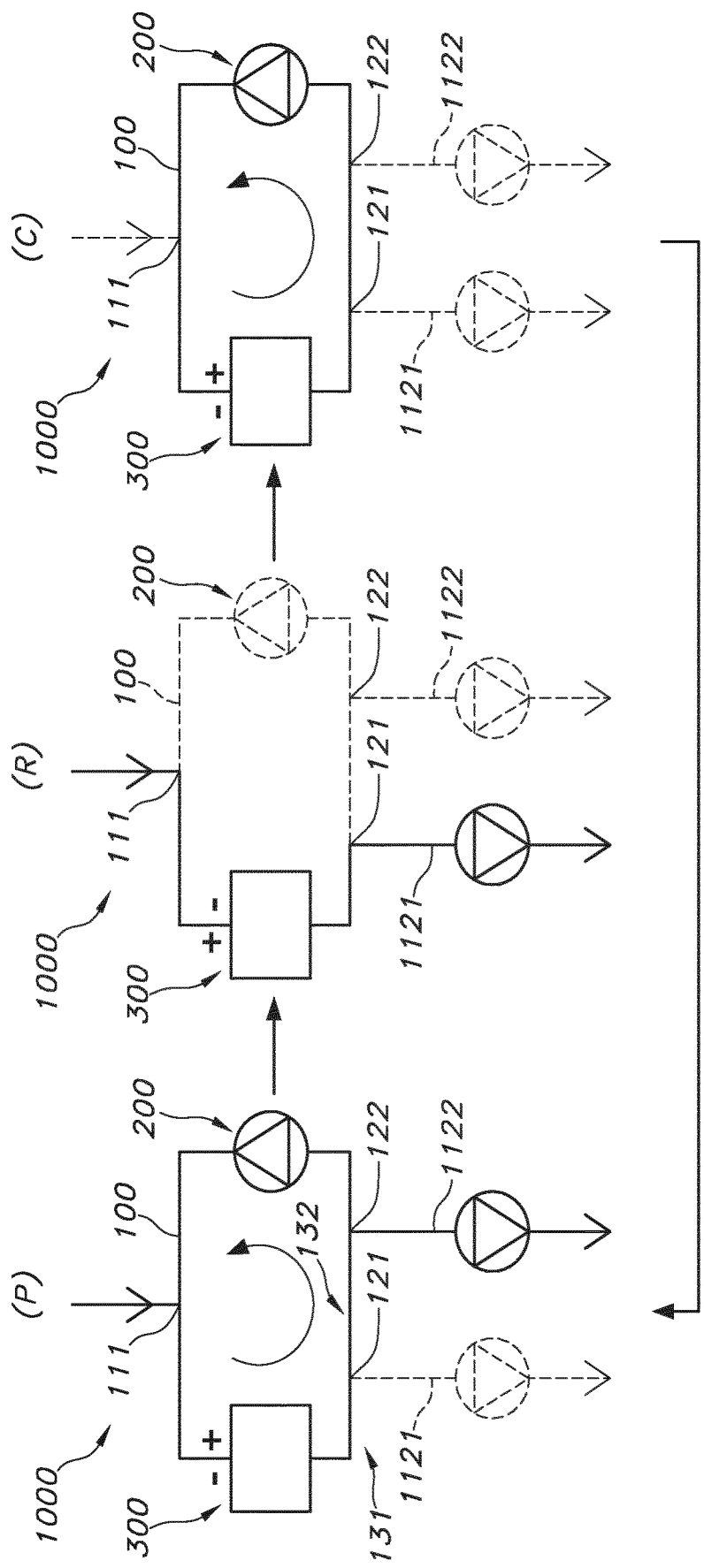
FIGS. 3-9 schematically depict some embodiments and variants.

This is very schematically indicated in FIG. 3. A large advantage of this system 1000 is that remaining waste water just downstream from the electrosorption cell unit 300 (here downstream defined relative to the flow in the regeneration stage) is no problem, as with a circulation this waste is again purified. Here, the recirculation loop 100 comprises a loop inlet 111, a first loop outlet 121, and a second loop outlet 122. Hence, the waste outlet 1121 and the purified liquid outlet 1122 do not share a loop outlet. Further, a first loop part 131 between the electrosorption cell unit 300 and the first loop outlet 121 having a first volume V1 is indicated, as well as a second loop part 132 downstream from the electrosorption cell unit 300 and upstream from the second loop outlet 122, optionally including an optional buffer reservoir (see FIG. 4), having a second volume V2. Especially, V1/V2<0.5. With a buffer reservoir, this ratio may easily be 0.1 or smaller.

Figure 4:
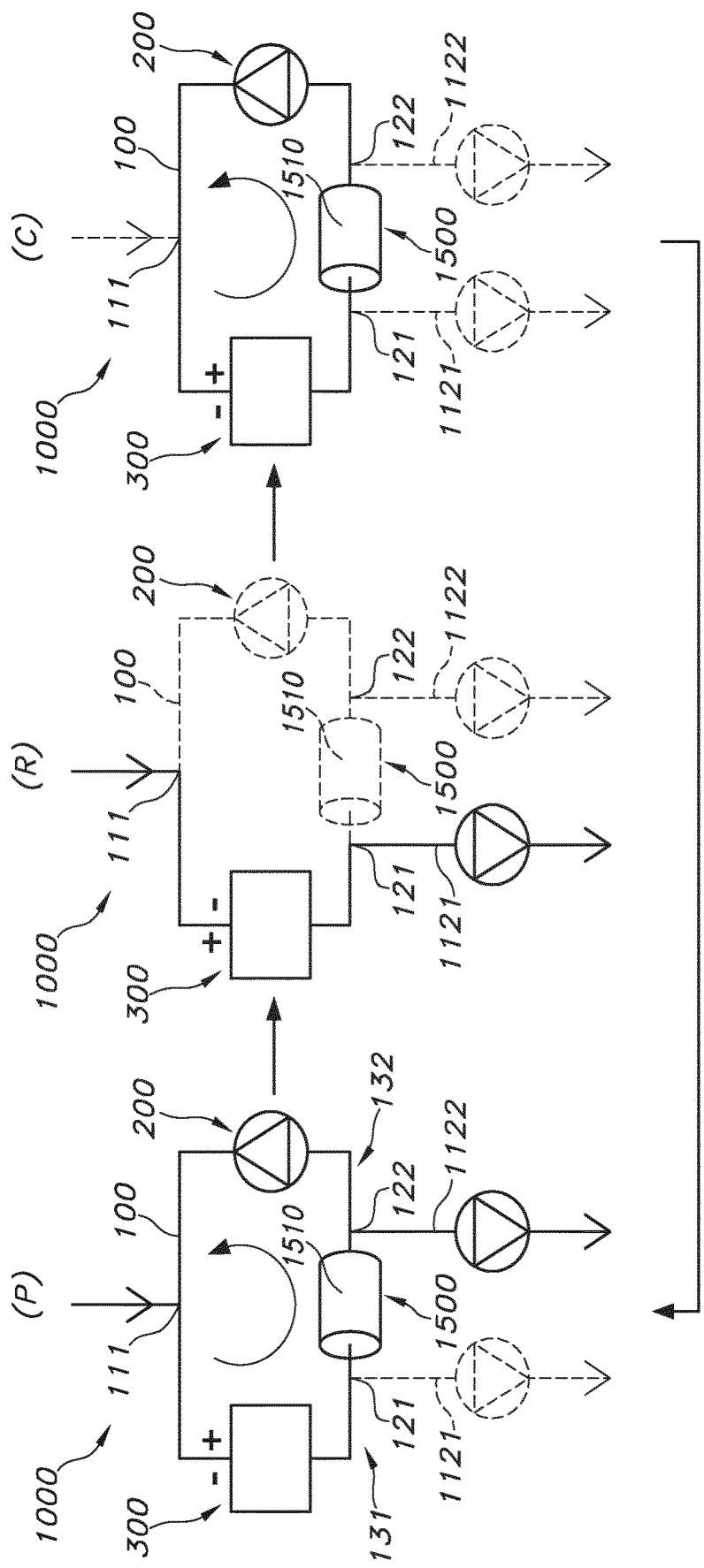
Figure 5:
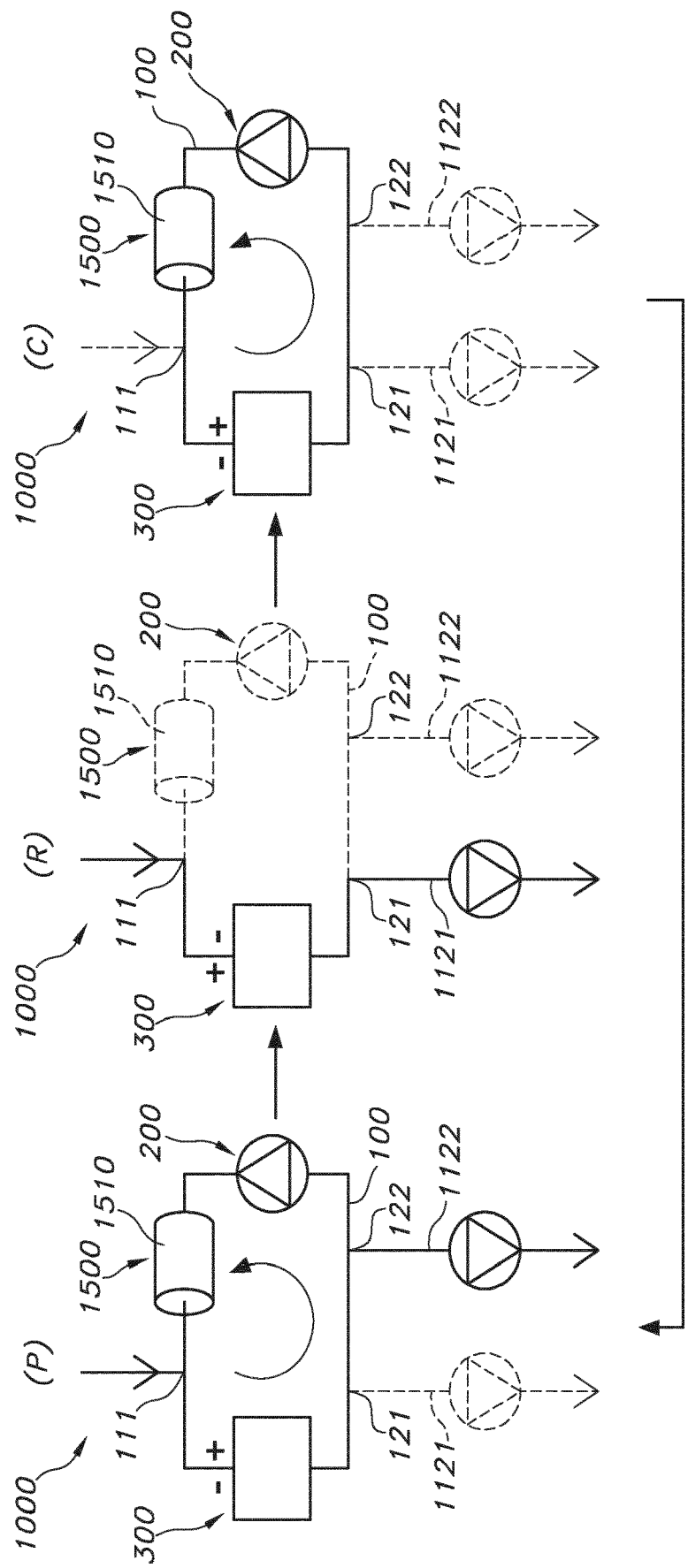
Figure 6:
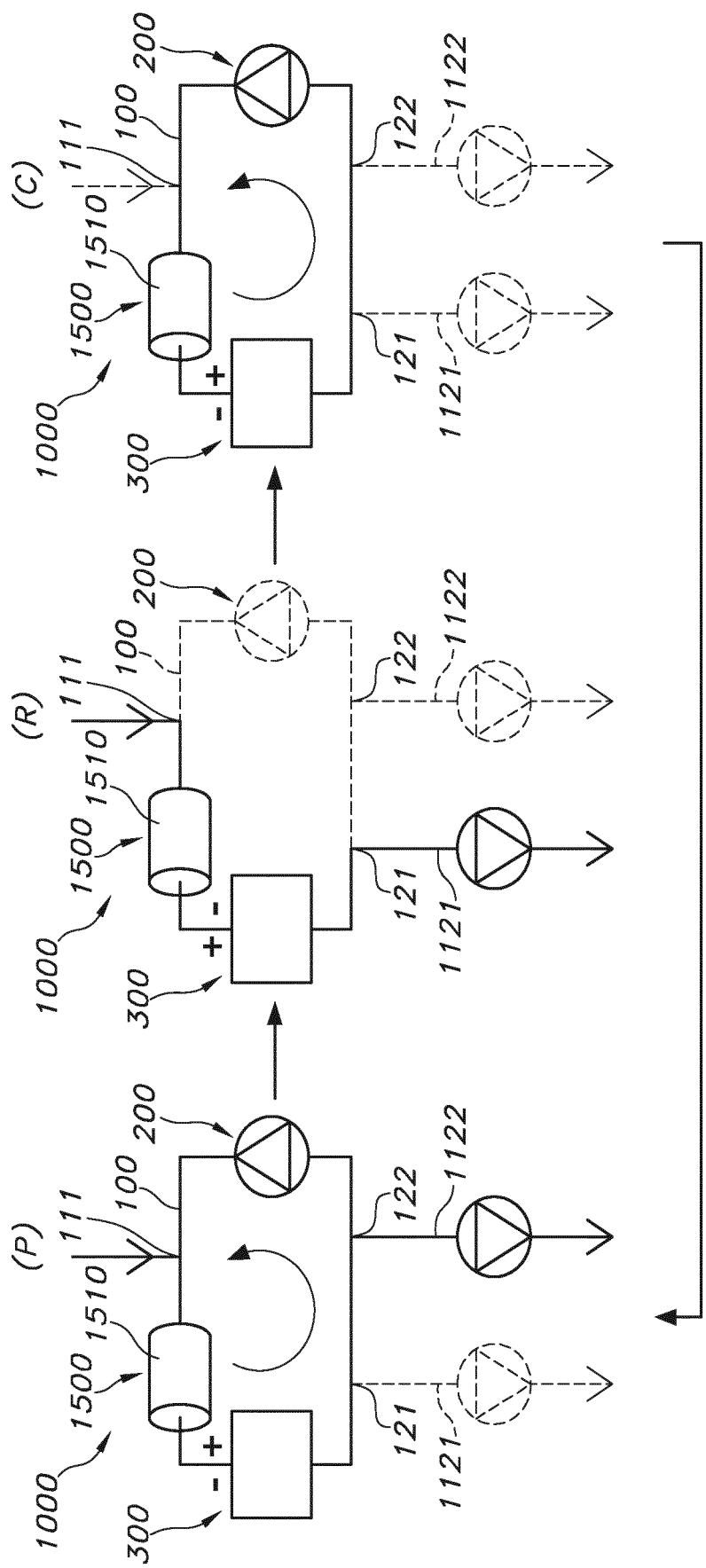
Figure 7:
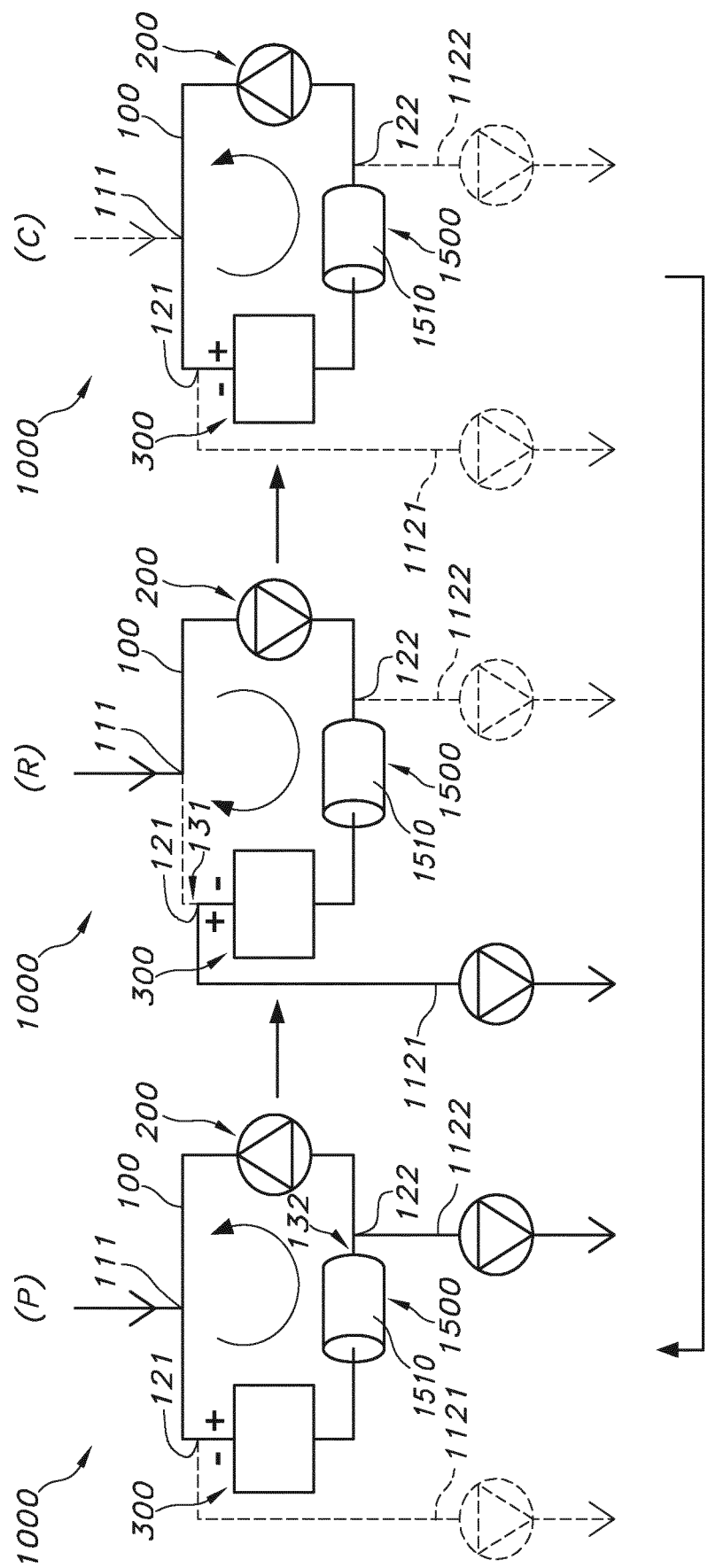
Figure 8:
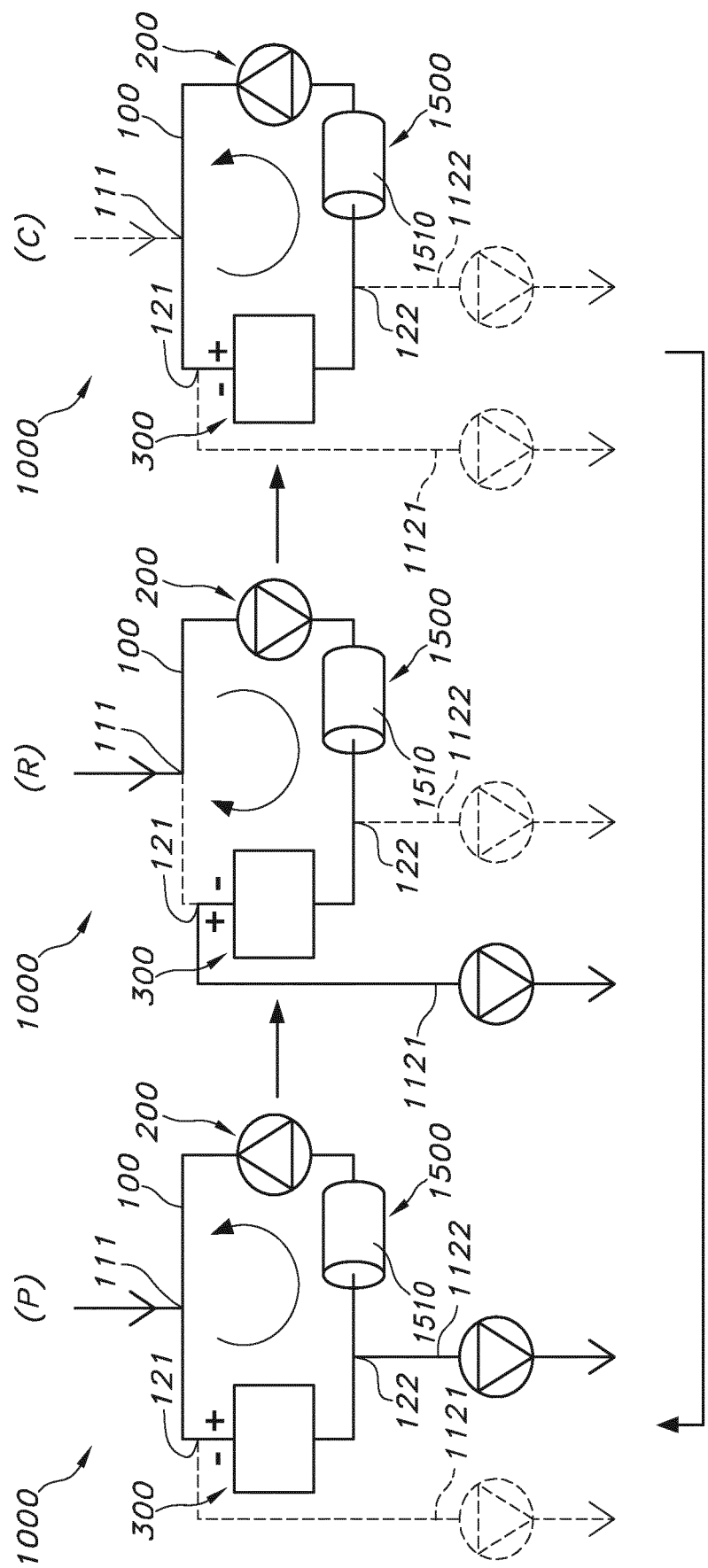
Figure 9:
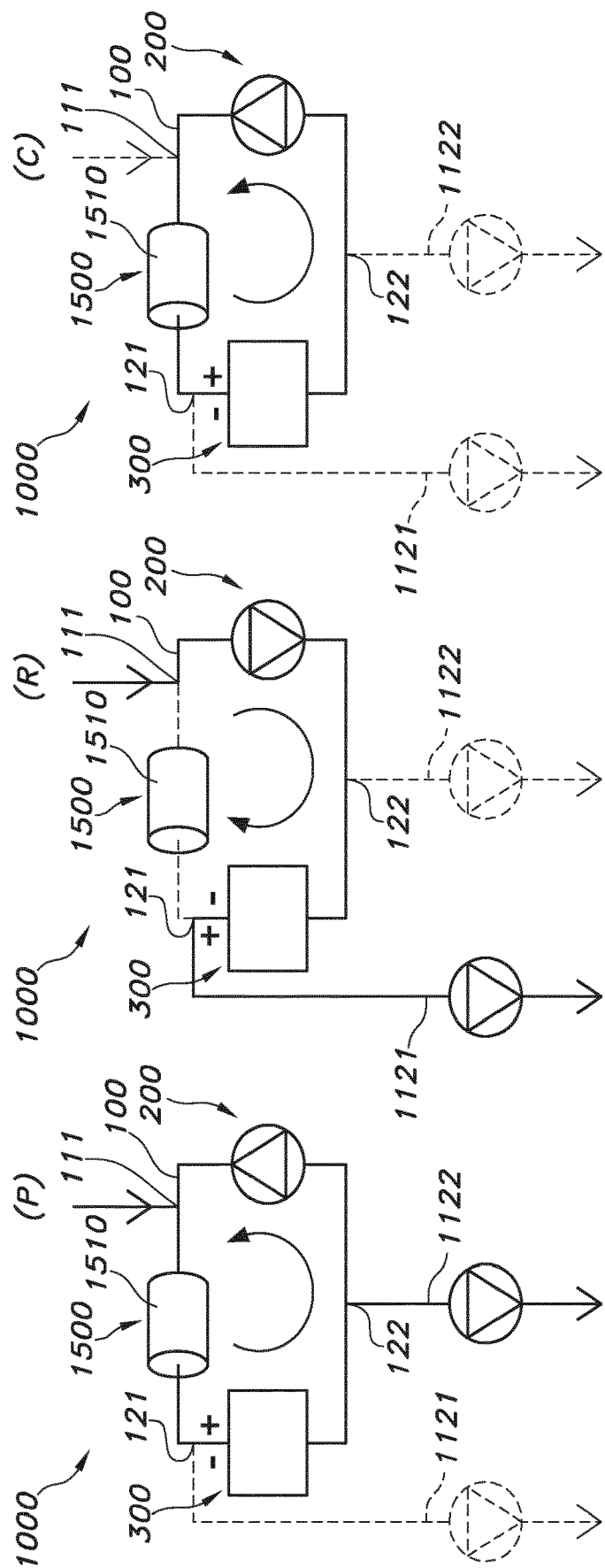

As indicated above, a buffer reservoir 1510 may be included in the recirculation loop, see FIG. 4. To this end, the system 1000 may include a buffer reservoir unit 1500, comprising said buffer reservoir 1510 (or a plurality of buffer reservoirs). An advantage of such buffer reservoir 1510 is that a surge need may easily be met. Further, the advantage of positioning the buffer reservoir inside the recirculation loop is that the purity of its purified aqueous liquid may be better maintained. The buffer reservoir unit 1500 may also include one or more filters, adsorbents, etc. Further, at the upstream side (and/or downstream side) of the buffer reservoir 1510 a valve may be configured, which may be shut during regeneration. FIGS. 5-9 schematically depict variants with other positions of the buffer reservoir 1510, the loop inlet 111, and the loop outlets 121,122, without aiming to have presented all possible variants.

Figure 10A:
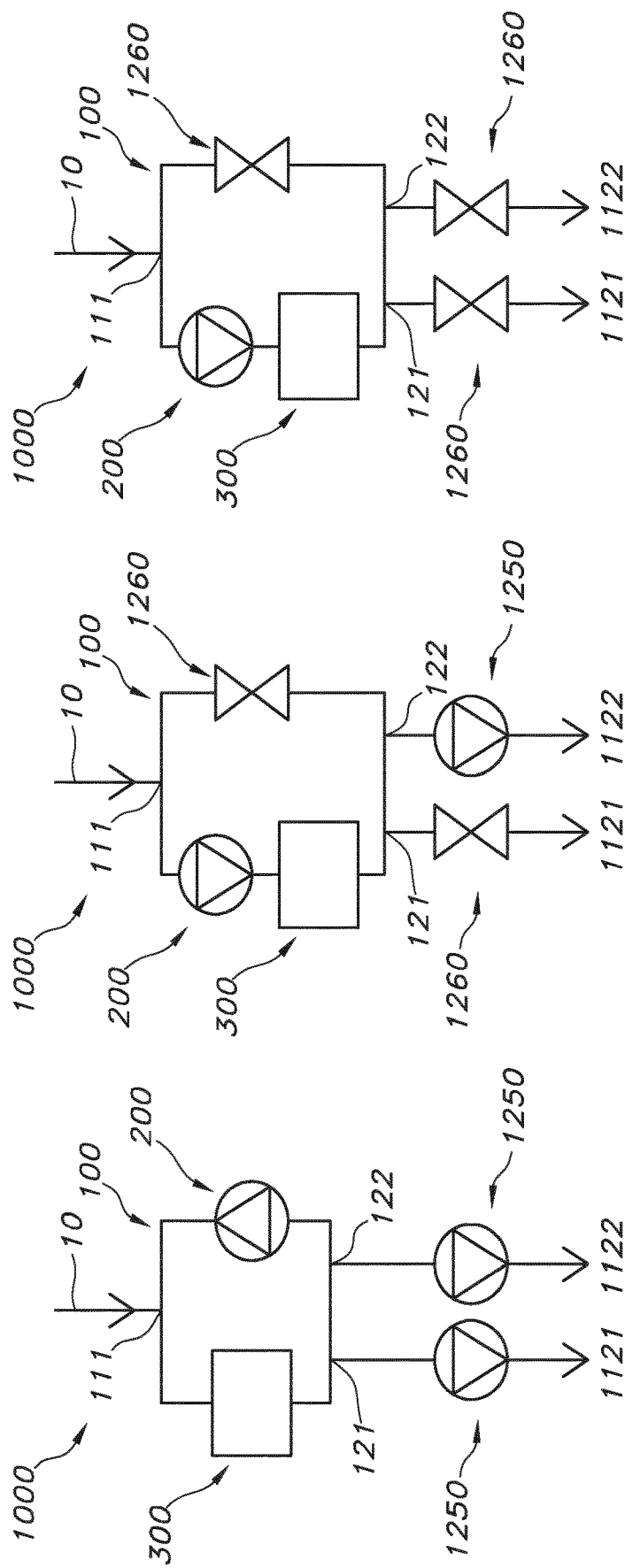
FIGS. 10a-10b schematically depict some variants for arranging pumps and valves.
Figure 10B:
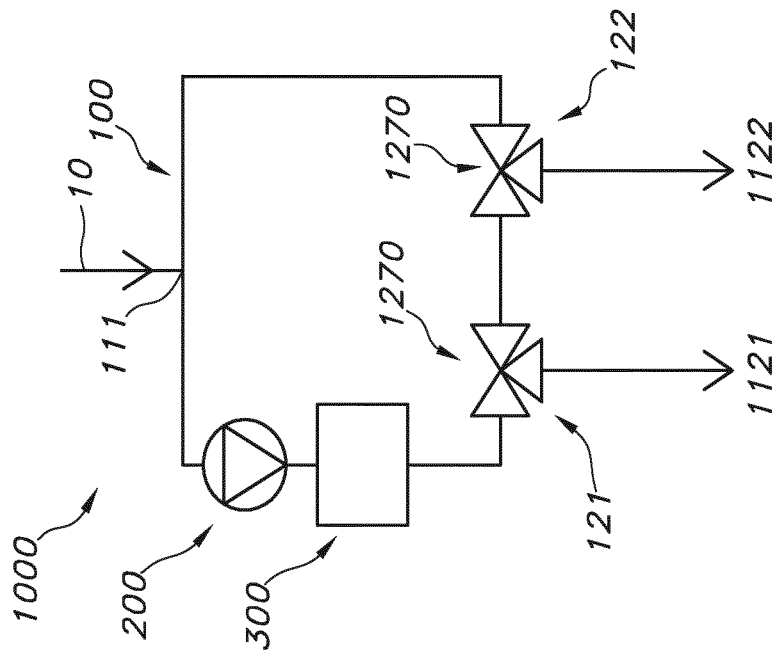
Figure 10B:
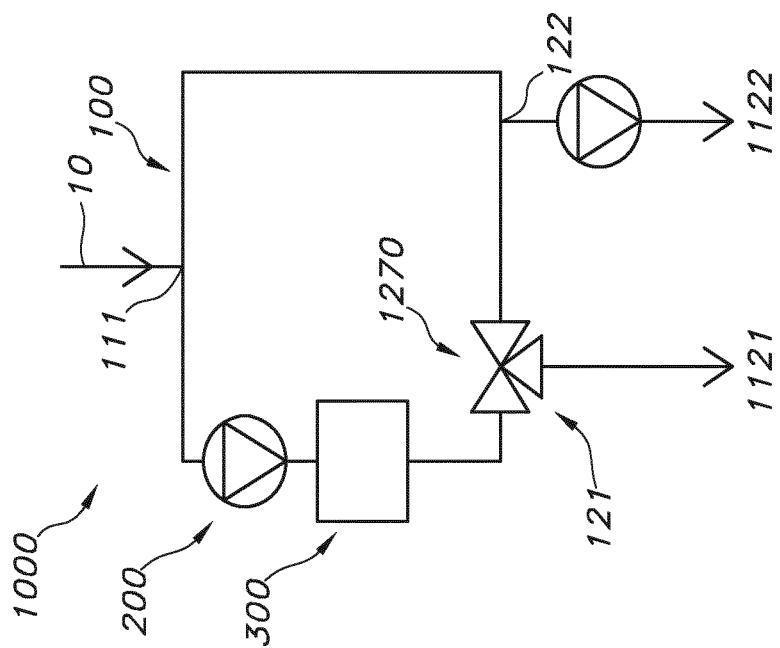

FIGS. 10*a*-10*b* schematically depict some variants of arranging a flow generation apparatus 200 and/or valves 1260, including optionally three-way valves 1270. Note that these schematic drawings only show a limited number of embodiments. Further, for recirculation especially at least a flow generation apparatus 200 is included in the recirculation loop 100, but other flow generation means may be arranged at any suitable place, or may even not be necessary, dependent upon the arrangement of (three-way) valves. Hence, the system 1000 may include one or more valves, amongst others optionally one or more three-way valves.

Figure 11:
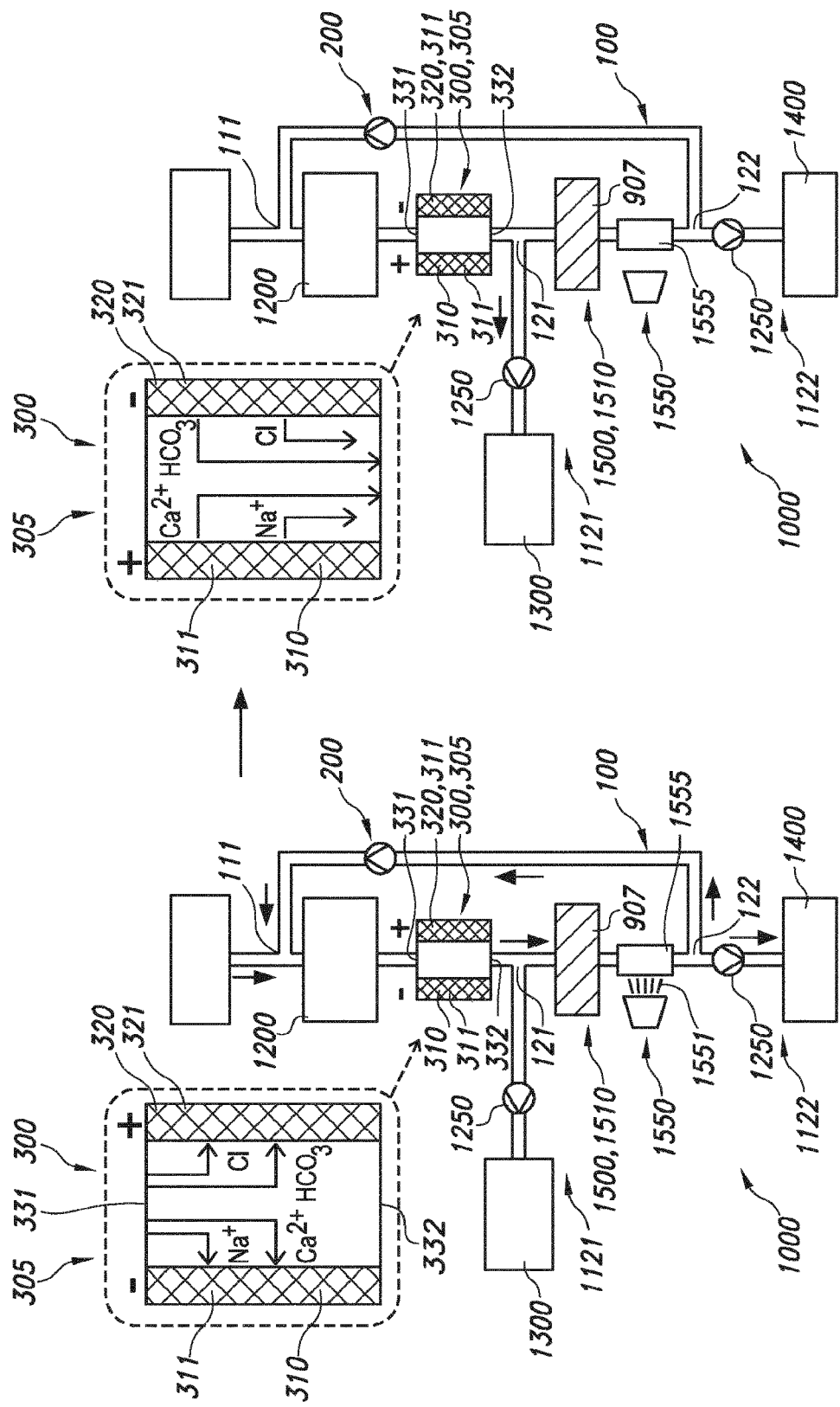
FIG. 11 schematically depicts an embodiment of the system, including some variants.

FIG. 11 schematically shows an embodiment of the system 1000, with left in the drawing the purification stage, and right in the drawing the regeneration stage. The embodiment schematically depicted in FIG. 11 further includes some optional elements. FIG. 11 thus also shows an example of an electrosorption system 1000 containing a recirculation loop 100 with separate branches for waste and output flow. As visible in the regeneration mode, this embodiment of the system 1000 contains the waste branch immediately downstream of the ES cell. This ensures that the highly compacted waste water (with extreme hardness) is directly pumped towards to waste tank, minimizing the possibility of fouling other parts of the system, especially those used in the purification mode (like the reservoir). Downstream of the waste branch is an optional buffer reservoir 1510 (comprised by buffer reservoir unit 1500). Its function is to allow for a peak flow rate in output maintaining adequate level of purification. Optionally a check valve is positioned at the inlet of the buffer reservoir (i.e. upstream of the buffer reservoir 1510). During purification the forced flow will open the check valve (at the expensive of a small pressure drop), but during regeneration this valve will remain closed and prevent diffusion of highly concentrated waste into the buffer reservoir. Downstream of the reservoir the output branch is located, with flow controlled by a separate pump ("application pump") to deliver the quantities of purified water requested by the appliance, for instance a steam iron or coffee maker. During the purification mode, most of the water will continuously be recirculated by the "recirculation pump" towards a mixing tank, indicated with reference 1200, where it is used to pre-dilute the input water before entering the electrosorption cell ("ES cell"). Inside the electrosorption cell, in the purification mode, ions will be adsorbed onto the porous active carbon electrodes 311,312, to maintain a level sufficiently low for the application. The idea with recirculation is that the ion concentration of the input water is reduced by a combination of pre-dilution with recirculated water from the buffer reservoir and passage through the ES cell. A 10-fold reduction in ion concentration, for instance from 20° dH hard water to 2° dH soft water, is achievable. In the regeneration mode, the electrodes of the ES cell will either be shortcut or receive reversed polarity, to force the previously adsorbed ions to desorb from the electrodes. During the desorption process the application and recirculation pumps are halted. Only a low flow, generated by the "drain pump 1250" is maintained to flush the desorbed ions towards the waste tank. When the ES cell contains an ion generating body then it is possible to operate the drain pump 1250 at a very low flow rate, creating extremely concentrated waste, for instance of 10 times higher ion concentration and hardness levels compared to the input water. This is because the ion generating body prevents calcification inside the ES cell.

Hence, FIG. 11 shows an embodiment of the deionization system 1000 configured to deionize an aqueous liquid 10. Here, the deionization system 1000 comprises (i) a recirculation loop 100 comprising a first loop inlet 111, a first loop outlet 121 and a second loop outlet 122. Here, the second loop outlet 122 is configured downstream from the first outlet 121. Further, the deionization system 1000 comprises (ii) a flow generation apparatus 200, configured to generate flow of the aqueous liquid 10 in the deionization system 1000; and (iii) an electrosorption cell unit 300 comprising a treatment section 305 for said aqueous liquid 10. The treatment section 305 comprises (a) a first electrosorption electrode arrangement 310 comprising a first electrosorption electrode 311, (b) a second electrosorption electrode arrangement 320 comprising a second electrosorption electrode 321, (c) a first treatment section opening 331 for introduction of the aqueous liquid 10 from the recirculation loop 100, and (d) a second treatment section opening 332 for releasing aqueous liquid 10 into the recirculation loop 100, wherein the treatment section 305 is configured downstream from the first loop inlet 111 and upstream of the second loop outlet 122.

Optionally, the deionization system 1000 may further comprise a mixing tank 1200, as schematically depicted in this embodiment. The mixing tank 1200 is especially configured downstream from the first loop inlet 111 and upstream of the electrosorption cell unit 300. Further, optionally the deionization system 1000 may also comprise a waste reservoir 1300, in fluid connection with the first loop outlet 121 and/or a purified liquid reservoir 1400, in fluid connection with the second loop outlet 122.

In an embodiment, it appears to be beneficial to fill up the inner volume of the buffer reservoir 1500 with active carbon powder or other adsorbent. The adsorbent, such as active carbon powder, is indicated with reference 907. This allows to purify components of the tap water not handled by the electrosorption cell, e.g. organic compounds, like humic acid, and chlorine typically present in tap water with the aim to inactivate micro-organisms. This is attractive for applications where the output water is used for consumption, for instance in coffee makers. Alternatively this active carbon powder could also be present in the mixing tank or in other parts of the recirculation loop piping or ES cell. It also appears to be beneficial to also incorporate a UV light source in the recirculation loop. UV light will inactivate micro-organisms, and thereby prevent biofilm formation inside the system. For instance for cold-water purification applications this is beneficial. Effectively the combination of electrosorption, plus active carbon filtering, plus UV light disinfection provides a full-range water treatment system, that is efficient in energy use and efficient with waste water. The UV light source may include a UV fluorescent lamp and/or an UV LED.

Yet, in this variant the deionization system 1000 may further optionally comprise a buffer reservoir 1510 comprised by the recirculation loop; here by way of example the buffer reservoir 1510 further comprises an adsorbent 907 for one or more of organic material and ions, such as e.g. active carbon. Yet, for the sake of completeness, also an UV light source is depicted. Hence, in a further variant the deionization system 1000 may further comprise a source 1550 of UV light configured to provide UV light to one or more of (i) the aqueous liquid 10 within the recirculation loop 100 and (ii) the aqueous liquid 10 within an element 1555 comprised by the recirculation loop 100. Reference 1551 indicates an UV transmissive conduit. Of course, the UV light source 1550 may also be configured within a conduit.

FIGS. 1a-11, for the sake of clarity, do not include all possible and/or optional elements, such as a DC power supply system, a switching element, a control unit, etc. However, as will be clear to person skilled in the art, each system and/or appliance according to the accompanying claims may include such DC power supply and switching element and control unit, etc.

Figure 12A:
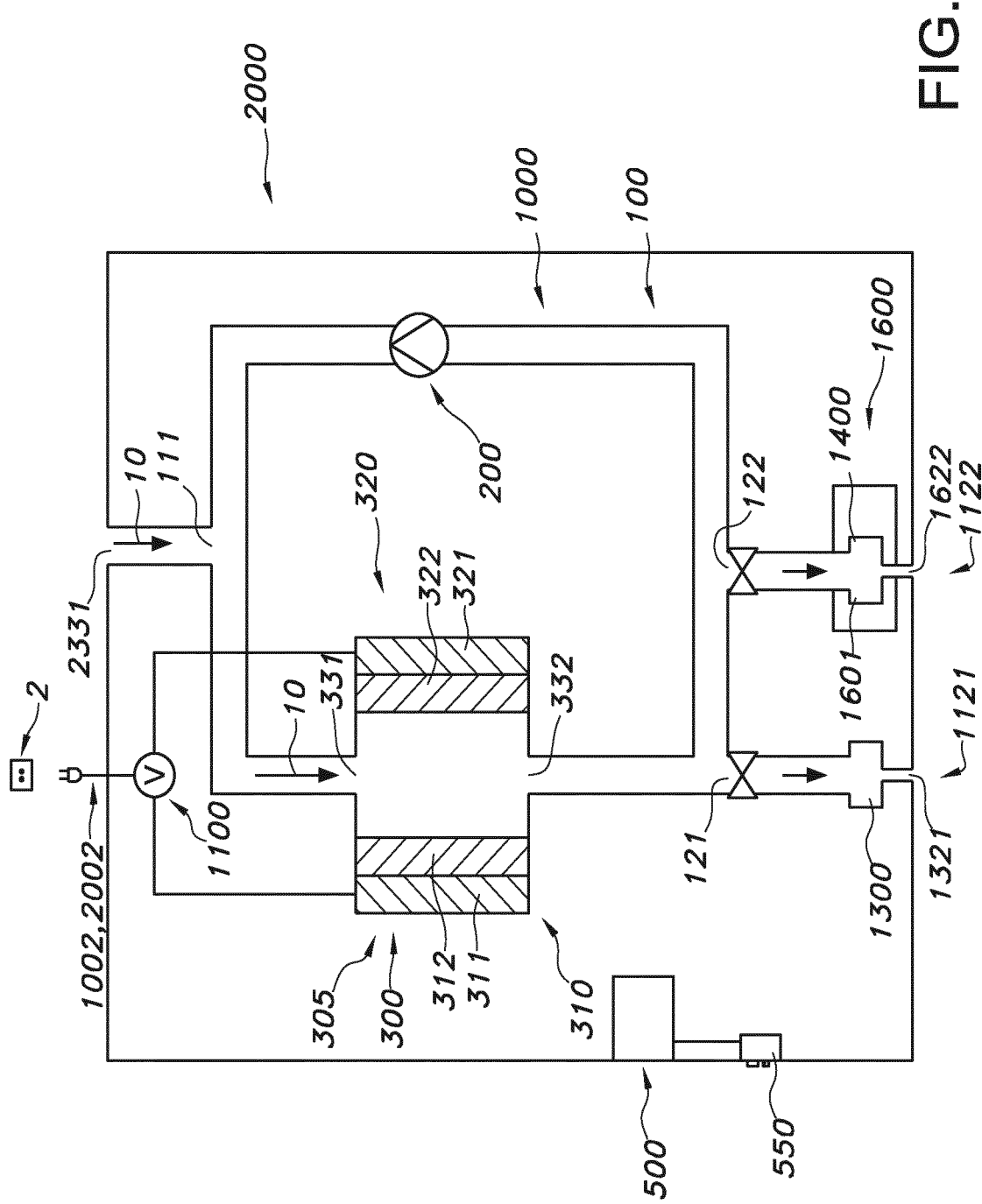
FIGS. 12a-12c schematically depict some applicances and embodiments of the system.
Figure 12C:
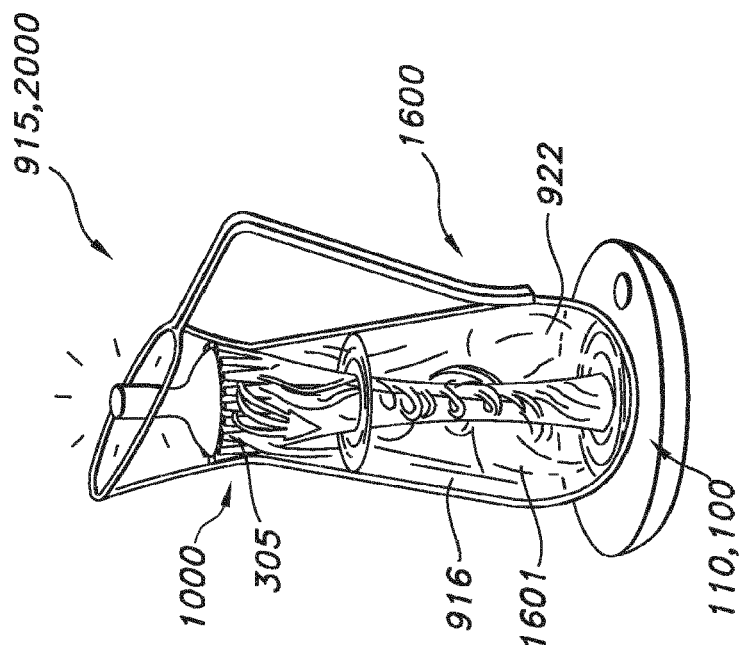
Figure 12B:
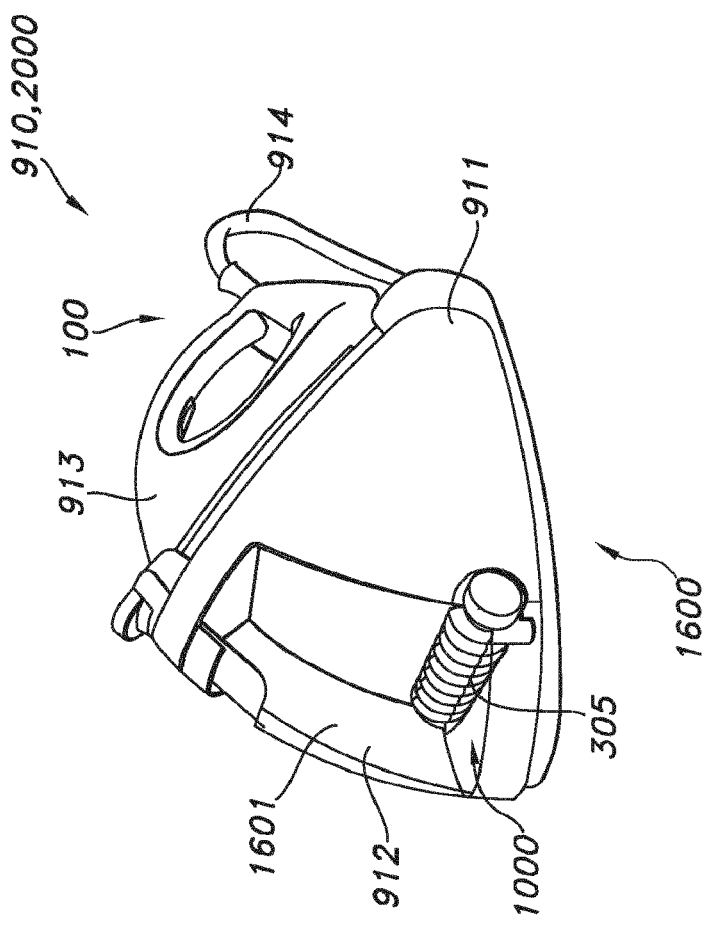

Referring to FIG. 12b, there is shown a steam system iron 910 as example of an electronic domestic appliance 2000. The steam system iron 910 comprises a base unit 911, an inlet reservoir 912 in the base unit 911, acting as a fluid reservoir, and a hand-held ironing unit 913. The inlet reservoir 912 is configured to hold an untreated aqueous solution, such as tap water, to be fed to a steam generator (not shown) in the base unit 911. The steam generator converts the fed aqueous solution to steam, which is fed to the ironing unit 913 through a hose 914. Alternatively, the steam generator (not shown) may be in the ironing unit 913. The ironing unit 913 is positionable against the fabric of a garment to emit steam onto the garment. Therefore, the fabric of a garment can be pressed and steamed.

The steam system iron 910 comprises a deionization system 1000. A detailed description of the deionization system 1000 can be found elsewhere herein. The deionization system 1000 is disposed between the inlet reservoir 912 and the steam generator. The deionization system 1000 comprises an inlet communicating with the inlet reservoir 912, a treatment section 305 and a treated aqueous solution section (not shown). The treatment section 305 is between the inlet reservoir 912 and the treated aqueous solution section. Alternatively, the treatment section 305 is disposed in, adjacent to or spaced from the inlet reservoir 912. The treatment section 305 is in fluid communication with aqueous solution in the inlet reservoir 912. An untreated aqueous solution received in the inlet reservoir 912 is fed through the treatment section 305 where it is treated. The treated aqueous solution is then fed from the treatment section 305 to a treated aqueous solution section. In this embodiment, the treated aqueous solution section is a steam generator (not shown) or a fluid passageway leading to a steam generator. However, in an alternative embodiment, the treated aqueous solution section is a fluid outlet from the treatment section 305, including but not limited to, a fluid passageway such as a pipe, or a hose, or a fluid vessel such as a tank.

FIG. 12a schematically depicts a further embodiment of the system 1000. Reference 500 indicates a control unit, e.g. configured to control the flow generation unit 200 and valves at e.g. the first loop outlet 121 and the second loop outlet 122, or other valves and/or valves at other location, not depicted herein, and also the DC power supply system 1100. Especially, this embodiment may further show ion selective membranes 312,322 at the electrode surfaces. Hence, in a variant the first electrosorption electrode arrangement 310 comprises said first electrosorption electrode 311 and a first ion selective membrane 312, and the second electrosorption electrode arrangement 320 comprises said second electrosorption electrode 321 and a second ion selective membrane 322. Hence, there is substantially only access to the electrodes 311,321 via the respective ion selective membranes 312,322. In this variant during the regeneration mode a non-zero potential difference may be used with polarity opposite to as used in the purification mode. The DC power supply system 1100 includes a DC power supply, such as a battery etc. The DC power supply may optionally receive power from an external (AC) power source 2, such as mains. A functional connection with an external power source is indicated with reference 1002 (functional connection of the system 1000 with the external power source) or alternatively reference 2002 (functional connection of the appliance 2000 with the external power source). The functional connection is schematically depicted with a cord and plug, but cordless powering may also be applied. Further, the DC power supply system may include a switching unit, configured to switch the polarity, such that the electrodes 311,321 may be subjected to potential differences having different signs, dependent upon the purification stage or regeneration stage, etc. (see the changes in signs in FIGS. 1a-11, and 13,14).

This schematic FIG. 12a also depicts an (electronic domestic) appliance 2000, comprising the system 1000. The appliance (and/or the system 1000) may further comprise a user interface 550. The (electronic domestic) appliance 2000 comprising the deionization system 1000, a first appliance opening 2331 in fluid connection with the first loop inlet 111, for introduction of aqueous liquid 10 to the electronic domestic appliance 1000, and a functional element storage 1600 wherein purified aqueous liquid 1601 is applied and/or stored for the functional element. For instance, the functional element may include a storage reservoir of a steam generator. Reference 1321 indicates a waste outlet, for removal of waste liquid. Reference 1622 indicates a functional element outlet, such as e.g. an opening in a steam generator sole or a coffee outlet of a coffee machine, etc. The functional element is herein not further described. Further, references 1002 or 2002 indicate a functional connection to e.g. a mains or other source of electrical power 2. References 1002 and 2002 define the functional connection of the system 1000 or appliance 2000, respectively. Optionally, this may be a corded connection. Note that FIG. 12a is used to schematically depict an embodiment, and variants thereof, of the system 1000, as well as an embodiment, and variants thereof, of the appliance 2000.

Although in FIG. 12b a steam system iron 910 is shown, the deionization system 1000 may be used with alternative garment care apparatus, or entirely other domestic appliances (such as mentioned herein). For example, the deionization system may be used with a steam iron or a garment steamer. An advantage of using a deionization system 1000 in a garment care apparatus, for example, is that the deionization system 1000 is able to act as a preventative measure to restrict calcification in the steam generator. This allows the steam generator to be designed without the need to account for calcification over time. Therefore, the size of steam generator may be minimised. Furthermore, scales will not be produced and will not be emitted towards garments being treated.

Reference 1600 refers to a storage or reservoir of a functional element using and/or storing purified aqueous liquid 1601. Here, the functional element may especially be the steam generator.

The deionization system 1000 is not limited to use with garment care apparatus. It is envisaged that the deionization system 1000 may be integrated into domestic appliances including, but not limited to, a floor steam cleaner, a food steamer, a kettle, a coffee maker, an espresso maker, a tea maker, a water carbonator, a water softener, a water purifier, an air humidifier, etc. The use of the deionization system 1000 in kettles and coffee makers may help to minimise maintenance and to prevent scales ending up in hot beverages. The treated aqueous solution can also be used in preparation of baby milk from powder to help reduce stress on the baby's kidneys, and to make soybean milk by aiding in the extraction of protein. In addition, it is envisaged that the deionization system 1000 may be used in conjunction with the kitchen sink water supply or for whole house water deionization applications.

For example, referring to FIG. 12c, there is shown a water jug 915, as example of an electronic domestic appliance 2000, comprising a chamber 916 and a treatment section 305. The treatment section 305 is in the chamber 916 for an aqueous solution. In this embodiment, the chamber 916 acts as both the inlet reservoir and treated aqueous solution section. The untreated aqueous solution is fed into the treatment section 305 through a fluid passageway (not shown) where it is partially treated and expelled back into the chamber 916 through another fluid passageway (not shown). The partially treated aqueous solution is then fed back into treatment section 305 and continues to be recirculated until it is treated to the desired level. Reference 922 refers to a chamber, acting as a treated aqueous solution section (elsewhere also indicated with reference 1400). This storage may comprise purified aqueous liquid 1601, which is consumed by this water jug appliance.

Figure 13:
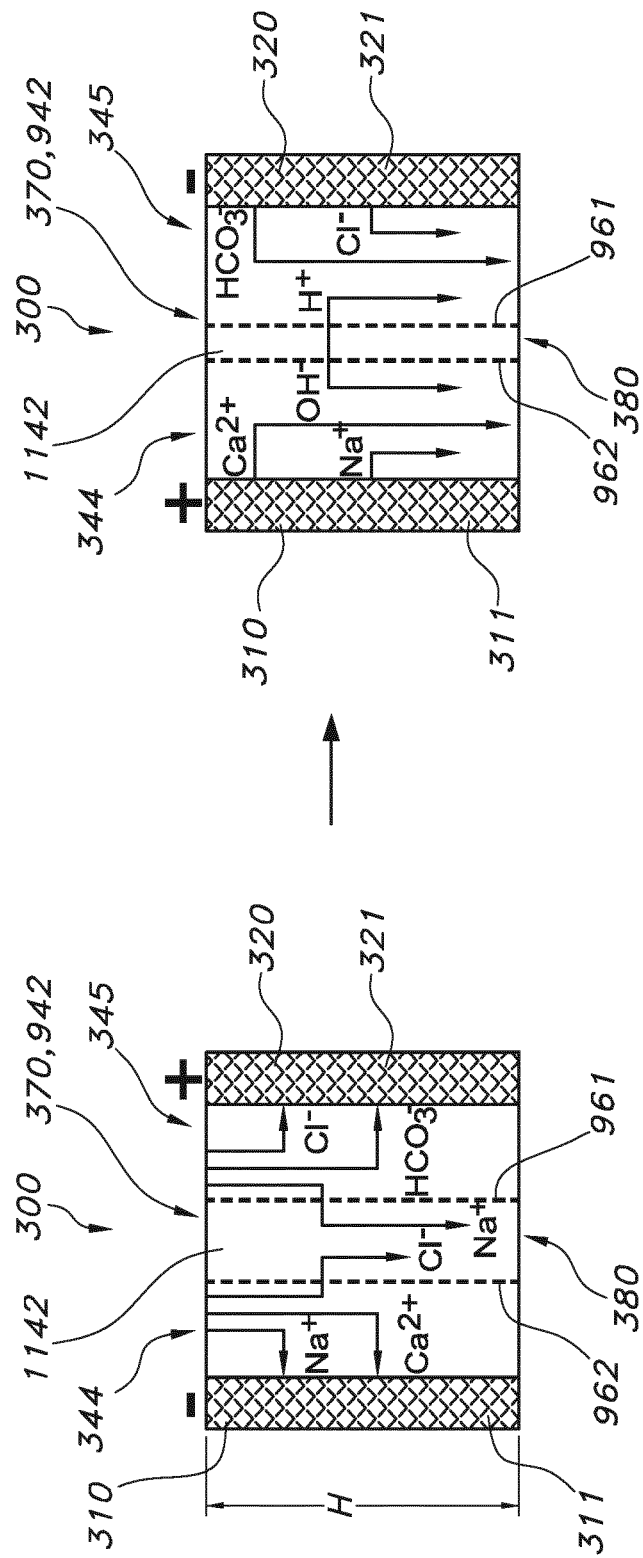
FIGS. 13-14 schematically depict some embodiments of the electrosorption cell.

FIG. 13 schematically shows embodiments of the electrosorption cell unit 300, in the purification mode (left) and the regeneration mode (right). Electrosorption electrodes 311,321 are applied. In this schematically depicted embodiment, by way of example the electrosorption cell further comprise ion exchange membranes 961,962 (which are configured at a distance of the first electrosorption electrode arrangement 310 and the second electrosorption electrode arrangement 320, respectively). Here, the ion exchange membranes 961,962 are configured as ion generating element 370, as during regeneration, the ion exchange membranes split water. Hence, here, the water splitting membrane 942 is used (a "water splitting membrane" or "bipolar membrane" comprises especially the combination of two opposite ion exchange membranes). Advantages of this embodiment are that there is no calcification during cell regeneration and there is no gas formation. Further, the waste volume may be much smaller, as during regeneration flow may be low (or zero). Only for drawing purposes the inter membrane distance in FIG. 13 on the left is larger than in FIG. 13 on the right. Further, note that when the water-splitting membrane, indicated with reference 380, is used, the water-splitting membrane may provide a third volume (or exchange membrane flow spacer), indicated with reference 1142, between the respective two cell parts. The ion exchange membrane 961 may be cation selective, and the ion exchange membrane 962 may be anion selective. The central volume may be in fluidic contact with the circulation loop, like the other parts 344 and 345 may be.

The height of the electrosorption electrodes 311,321 and the ion generating element 370 is indicated with reference H. The schematically shown embodiments of the electrosorption cell unit 300 show that these all have substantially the same height.

By interposing the ion generating element 370 between the electrode arrangements 310,320, in fact two cells are provided. Hence, the deionization system 1000 may further comprise a first cell 344 comprising said first electrosorption electrode arrangement 310, and a second cell 345 comprising said second electrosorption electrode arrangement 320, wherein the first cell 344 and the second cell 345 are separated by a water splitting membrane 380 or by an electrically floating electrode (see below).

When no ion selective membranes are applied, in the regeneration mode no potential difference may be applied and no ion generating element may not be used. The ions adsorbed in the purification mode are released in the regeneration mode, but calcification may happen inside the electrosorption cell unit 300 during regeneration.

Figure 14:
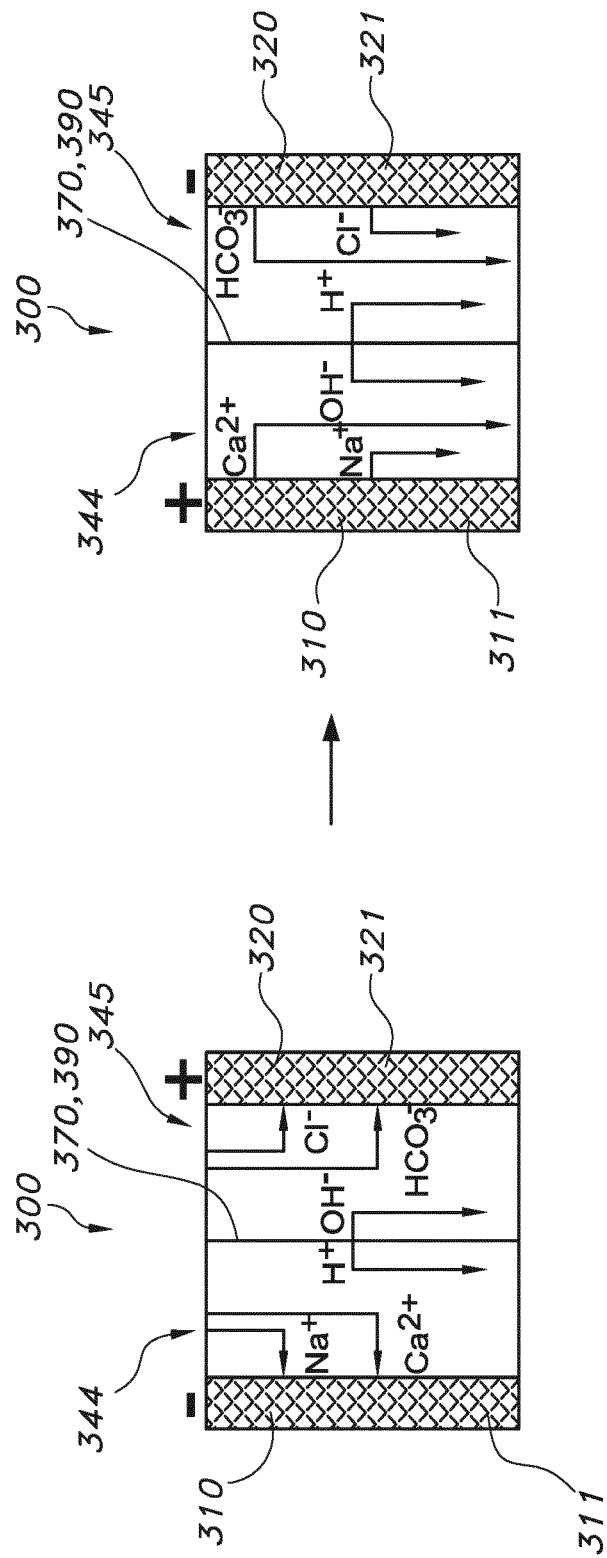

FIG. 14 schematically depicts essentially the same embodiment as schematically depicted in FIG. 13 with the exception that instead of the ion exchange membranes 961,962 (i.e. the ion generating element 370) configured between the electrosorption electrodes 311,321 now the ion generating element 370 is an electrode (here a floating electrode 390). This embodiment may have the same advantages as the former embodiment, though some gas formation may occur. A further advantage of this embodiment is that the electrolytic cell may be extremely thin.

Note that all embodiments according to the invention are described and schematically depicted in relation to deionization system 1000 having a single electrolytic cell unit. However, the invention is not limited to such embodiments. In contrast, the deionization system may include a plurality of such cells, including tubing and pumps, thereby allowing a continuous purification of the aqueous solution, while some cells may purify, while others regenerate, while at a later moment this may be reversed, while thus still producing a purified aqueous solution.

Hence, in an embodiment the invention provides amongst others two types of electrodes used in two consecutive stages of electrical driving or in two parallel stages.

In an embodiment, in a first stage (herein also indicated as "purification stage" or "purification mode" or the "filling mode"), under normal (filling) operation, potentials are applied to first and second opposing "electrosorption" electrodes, to store cations in a first (low potential), and anions in a second electrode (high potential). This may ensure that the total ion content of the water passing the two electrodes will be significantly reduced, until the total absorption capacity of first and second electrosorption electrodes is reached. In a second stage (herein also indicated as "regeneration mode" or the "descaling mode"), for descaling maintenance, a third non-electrosorption electrode (with typically only geometric surface area, without porosity) is interposed between first and second electrodes, such that (effectively) two separate cells are formed. The applied potentials are reversed (when the same cell is used as used for the purification stage), with a high potential to the first electrode, a low potential to second electrode and floating potential to the third electrode. Under influence of those potentials, the previously stored cations and anions will be effectively released to their respective cells, and each balanced by $OH^-$ and $H^+$ respectively, that forms by electrolysis reactions occurring at the third non-electrosorption electrode. Consequently, the first cell with the first electrode will become alkaline, converting the released calcium and magnesium ions into solid hydroxide salts. The second cell with the second electrode will become acidic, converting the released bicarbonate ions into $CO_2$ gas, and additionally the released chloride ions at the third electrode will react to chlorine gas. In addition the electrolysis reactions at the third electrode will form hydrogen gas in the first cell and oxygen gas in the second cell.

Would however the regenerating electrosorption cell not have an interposed ion generating body, as described in the present invention, this would imply a inefficient operation. To avoid calcification problems inside the regeneration cell a minimal flow rate has to be maintained, leading to a significant waste volume. Hence, the ion generating body, such as an interposed electrode, provides large advantages over state of the art solutions, and reduces waste formation.

As indicated above, an ion generating body is applied. This ion generating body may comprise a water splitting membrane or simply an electrode (like a Pt plate). The latter is herein also indicated as third electrode.

We have surprisingly found that the third interposed electrode during regeneration does not require an electrical connection. If this third electrode remains unconnected, floating, it will automatically receive a potential in between opposing electrosorption electrodes. An advantage of a floating electrode is that it requires fewer components and allows for more design options. A further advantage of the floating electrode is that equal amounts of hydrogen cations and hydroxide anions are created at opposite sides of this electrodes, thereby ensuring that the overall pH of the combined solutions in the electrolytic cell remains unaffected. An alternative embodiment to the interposed electrode is an interposed bipolar membrane. Similar to the interposed electrode, this bipolar membrane may be inserted only during regeneration (though other embodiments are also possible, such as a permanent interposure, etc.). Also this interposed bipolar membrane does not need an electrical connection. A bipolar membrane may consist of a cation exchange membrane and anion membrane laminated together. During regeneration, especially the cation exchange membrane side should face the negative electrosorption electrode and releases H+ ions. Vice versa the anion exchange membrane side should face the positive electrosorption electrode and releases OH− ions. An additional advantage compared to a metal interposed electrode is that a bipolar membrane generates H+/OH− by auto-ionisation of water, not electrolysis, so hydrogen, oxygen and chlorine gas formation is avoided.

In arrangements, the first and second electrosorption electrodes 311,321 are e.g. formed from activated carbon. However it will be understood that other suitable materials may be used. The activated carbon electrode may have a surface area of the order of 1000 $m^2/g$.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

The invention claimed is:

1. A deionization system configured to deionize an aqueous liquid, wherein the deionization system comprises:
   a recirculation loop comprising a first loop inlet, a first loop outlet for waste liquid and a second loop outlet for purified aqueous liquid;
   a flow generation apparatus configured to generate flow of the aqueous liquid in the deionization system;
   an electrosorption cell unit comprising a treatment section for said aqueous liquid, wherein the treatment section comprises (a) a first electrosorption electrode arrangement comprising a first electrosorption electrode, (b) a second electrosorption electrode arrangement comprising a second electrosorption electrode, (c) a first treatment section opening for introduction of the aqueous liquid from the recirculation loop, and (d) a second treatment section opening for releasing aqueous liquid into the recirculation loop, and wherein the treatment section is configured downstream from the first loop inlet and upstream of the second loop outlet based on a flow starting at the first loop inlet, flowing through the recirculation loop and ending at the first loop inlet after a single recirculation;
   a first loop part, in the recirculation loop, downstream from the electrosorption cell unit and upstream from the first loop outlet, the first loop part having a first volume (V1); and
   a second loop part, in the recirculation loop, downstream from the electrosorption cell unit and upstream from the second loop outlet, the second loop part having a second volume (V2), wherein $V1/V2<0.5$.

2. The deionization system according to claim 1, wherein $V1/V2<0.1$.

3. The deionization system according to claim 1, further comprising a mixing tank configured downstream from the first loop inlet and upstream of the electrosorption cell unit.

4. The deionization system according to claim 1, further comprising one or more of (i) a waste reservoir, in fluid connection with the first loop outlet, (ii) a purified liquid reservoir, in fluid connection with the second loop outlet, and (iii) a buffer reservoir comprised by the recirculation loop.

5. The deionization system according to claim 4, comprising said buffer reservoir, and further comprising a mixing tank configured downstream from the first loop inlet and upstream of the electrosorption cell unit.

6. The deionization system according to claim 4, comprising said buffer reservoir, wherein the buffer reservoir further comprises an adsorbent for one or more of organic material and ions.

7. The deionization system according to claim 1, further comprising a source of UV light configured to provide UV light to one or more of (i) the aqueous liquid within the recirculation loop and (ii) the aqueous liquid within an element comprised by the recirculation loop.

8. The deionization system according to claim 1, wherein the second loop outlet is configured downstream from the first loop outlet.

9. The deionization system according to claim 1, wherein the first electrosorption electrode arrangement comprises said first electrosorption electrode and a first ion selective membrane, wherein the second electrosorption electrode arrangement comprises said second electrosorption electrode and a second ion selective membrane, and wherein one of the first ion selective membrane and the second ion selective membrane is selective for one or more cations and another is selective for one or more anions.

10. The deionization system according to claim 1, further comprising a first cell comprising said first electrosorption electrode arrangement, and a second cell comprising said second electrosorption electrode arrangement, wherein the first cell and the second cell are separated by a water splitting membrane or by an electrically floating electrode, and wherein both the first cell and the second cell are at one side in fluid connection with the first loop inlet, and at another side in fluid connection with the second loop outlet.

11. The deionization system according to claim 1, comprising a plurality of electrosorption cell units, each with said treatment section configured downstream from the first loop inlet and upstream of the second loop outlet.

12. The deionization system according to claim 1, further comprising a DC power supply system configured to provide a voltage difference between the first electrosorption electrode and second electrosorption electrode during a purification stage or a regeneration stage.

13. A method for deionization of an aqueous liquid, using the deionization system according to claim 1, wherein the method comprises a purification stage, wherein at least part of the aqueous liquid is released from the recirculation loop via the second loop outlet, and wherein the method further comprises a regeneration stage, wherein aqueous liquid is released from the recirculation loop via the first loop outlet.

14. An electronic domestic appliance comprising:
   a user interface;
   a first appliance opening;

a deionization system, wherein the deionization system comprises:

a recirculation loop comprising a first loop inlet, a first loop outlet for waste liquid and a second loop outlet for purified aqueous liquid, wherein the first appliance opening is in fluid connection with the first loop inlet, for introduction of an aqueous liquid to the electronic domestic appliance;

a flow generation unit, configured to generate flow of the aqueous liquid in the deionization system;

an electrosorption cell unit comprising a treatment section for said aqueous liquid, wherein the treatment section comprises (a) a first electrosorption electrode arrangement (b) a second electrosorption electrode arrangement, (c) a first treatment section opening for introduction of the aqueous liquid from the recirculation loop, and (d) a second treatment section opening for releasing the aqueous liquid into the recirculation loop, and wherein the treatment section is configured downstream from the first loop inlet and upstream of the second loop outlet based on a flow starting at the first loop inlet, flowing through the recirculation loop and ending at the first loop inlet after a single recirculation; and a functional element storage wherein the purified aqueous liquid is applied and/or stored.

15. The electronic domestic appliance according to claim 14, wherein the electronic domestic appliance comprises one selected from the group consisting of a floor steam cleaner, a food steamer, a kettle, a coffee maker, an espresso maker, a tea maker, a water carbonator, a water softener, a water purifier, a steam iron, and an air humidifier.

16. The electronic domestic appliance according to claim 14, further comprising:

a waste outlet for removal of the waste liquid; and
a control unit configured to:
control the flow generation unit, valves at the first loop outlet, and valves at the second loop outlet.

17. The electronic domestic appliance according to claim 14, wherein the functional element storage comprises a functional element outlet.

18. A deionization system comprising:

a recirculation loop comprising a first loop inlet, a first loop outlet for waste liquid, a second loop outlet for purified aqueous liquid, and a buffer reservoir unit;

a flow generation apparatus, configured to generate flow of the aqueous liquid in the deionization system;

an electrosorption cell unit comprising a treatment section for said aqueous liquid, wherein the treatment section comprises (a) a first electrosorption electrode arrangement, (b) a second electrosorption electrode arrangement, (c) a first treatment section opening for introduction of the aqueous liquid from the recirculation loop, and (d) a second treatment section opening for releasing aqueous liquid into the recirculation loop, and wherein the treatment section is configured downstream from the first loop inlet and upstream of the second loop outlet based on a flow starting at the first loop inlet, flowing through the recirculation loop and ending at the first loop inlet after a single recirculation; and a mixing tank configured downstream from the first loop inlet and upstream of the electrosorption cell unit.

19. The deionization system of claim 18, wherein the buffer reservoir unit includes a buffer reservoir, and wherein the buffer reservoir is configured upstream from the second loop outlet and downstream of the first loop outlet.

20. The deionization system of claim 18, wherein the mixing tank is used to mix fresh aqueous liquid with recirculated aqueous liquid.

* * * * *